(12) United States Patent
Spruck et al.

(10) Patent No.: US 8,780,331 B2
(45) Date of Patent: Jul. 15, 2014

(54) EVALUATION DEVICE, MEASURING ARRANGEMENT AND METHOD FOR PATH LENGTH MEASUREMENT AND MEASURING SYSTEM AND METHOD FOR A COORDINATE MEASURING DEVICE AND COORDINATE MEASURING DEVICE

(75) Inventors: Bernd Spruck, Moegglingen (DE); Frank Hoeller, Aalen (DE); Cristina Alvarez Diez, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 312 days.

(21) Appl. No.: 13/377,440

(22) PCT Filed: Jun. 10, 2010

(86) PCT No.: PCT/EP2010/058138
§ 371 (c)(1),
(2), (4) Date: Dec. 9, 2011

(87) PCT Pub. No.: WO2010/142757
PCT Pub. Date: Dec. 16, 2010

(65) Prior Publication Data
US 2012/0086933 A1 Apr. 12, 2012

(30) Foreign Application Priority Data
Jun. 10, 2009 (DE) .......................... 10 2009 024 464

(51) Int. Cl.
*G01C 3/08* (2006.01)
(52) U.S. Cl.
USPC ........................... 356/5.01; 356/4.01; 356/5.1
(58) Field of Classification Search
USPC ........................ 356/3.01–3.15, 6–22, 28, 28.5
See application file for complete search history.

(56) References Cited

U.S. PATENT DOCUMENTS

| 4,537,502 A * | 8/1985 | Miller et al. ................. 356/5.11 |
| 4,818,100 A | 4/1989 | Breen |
| 2004/0027554 A1* | 2/2004 | Ishinabe et al. ................ 356/5.1 |
| 2008/0049231 A1* | 2/2008 | Bachalo et al. ............... 356/484 |

FOREIGN PATENT DOCUMENTS

| CN | 101213474 | 7/2008 |
| DE | 1031005 | 5/1958 |
| DE | 10126585 A1 | 5/2002 |
| DE | 10118392 | 11/2002 |

(Continued)

OTHER PUBLICATIONS

Kaoru Minoshimia and Hirokazu Matsumoto, High-Accuracy Measurement of 240-m Distance in an Optical Tunnel by Use of a Compact Femtosecond Laser, Allied Optics, Oct. 20 2000.

*Primary Examiner* — Luke Ratcliffe
(74) *Attorney, Agent, or Firm* — Sand & Sebolt

(57) ABSTRACT

An evaluation device for path length measurement configured to evaluate a measured signal representing an intensity of a sequence of pulses of electromagnetic radiation, particularly a sequence of light pulses, as a function of time, after the sequence has traveled through a path length to be measured. The sequence of light pulses is generated with a repetition rate by a radiation source, particularly a light source. The evaluation device is configured to evaluate a first component of the measured signal, which oscillates with a first frequency, and a second component of the measured signal, which the second component oscillates with a second frequency that is greater than the first frequency. The first frequency may correspond to the repetition rate or a multiple of the repetition rate. The second frequency may correspond to another multiple of the repetition rate.

25 Claims, 14 Drawing Sheets

(56) References Cited

FOREIGN PATENT DOCUMENTS

| DE | 102008045386 | 3/2010 |
| DE | 102008045387 | 3/2010 |
| EP | 1672383 A1 | 6/2006 |

* cited by examiner

EVALUATION DEVICE, MEASURING ARRANGEMENT AND METHOD FOR PATH LENGTH MEASUREMENT AND MEASURING SYSTEM AND METHOD FOR A COORDINATE MEASURING DEVICE AND COORDINATE MEASURING DEVICE

CROSS-REFERENCE TO RELATED APPLICATIONS

This application is a National Phase Entry of PCT/EP2010/058138 having an International Filing Date of Jun. 10, 2010, which PCT application claims priority from German Patent Application No. DE 10 2009 024 464.6 filed Jun. 10, 2009.

The invention relates to an evaluation device, a measuring arrangement and a method for path length measurement. The present invention relates in particular to an evaluation device, a measuring arrangement and a method for path length measurement using optical measuring techniques. The invention further relates to a measuring arrangement for a coordinate measuring device, to a coordinate measuring device and to a method for a coordinate measuring device, wherein a position of a measuring head is determined using optical measuring techniques.

The measurement of distances has a variety of application areas, for example in the control or in the feedback control of various machines and apparatuses in industry, medicine, and entertainment industry. Measuring distances of an object relative to plural reference positions, or of plural points of an object relative to a reference position, allows the position of an object to be determined in a two- or three-dimensional space, which has wide applicability in production technology or quality control, for example.

Coordinate measuring devices are an example for a field of application in which it is desired to determine a position in a three-dimensional space with as high a precision as possible. Coordinate measuring devices typically have a measuring head which may be provided with a stylus or another sensor system. In order to determine positions on an object surface, the position of the measuring head and, if the stylus is supported displaceably on the measuring head, the position of the stylus relative to the measuring head are determined. Conventionally, linear scales are provided in the coordinate measuring device for determining the position of the measuring head, the linear scales indirectly providing a feedback on the position of the measuring head through the displacement paths along the individual axes. However, this requires a robust mechanical construction to avoid a corruption of measured results by a play which may be present or by mechanical deformations.

Distances may be determined by measuring a path length covered by electromagnetic radiation, such as light. To this end, the electromagnetic radiation travels once or plural times through a path between a reference position and the object, so that the distance can be derived from the path length covered by the radiation.

It is a technical challenge to implement devices and methods in which distances or object positions are determined with a precision in the range of a few micrometers or a few tens of micrometers, in spaces having a length of a few meters. This applies in particular if positions are to be determined at a high measurement rate.

Laser path length measuring devices allow a distance of an object to be determined. In K. Minoshima and H. Matsumoto, "High-accuracy measurement of 240-m distance in an optical tunnel by use of a compact femtosecond laser", Applied Optics, Vol. 39, No. 30, pp. 5512-5517 (2000), a distance measurement using optical frequency combs is described. In this measurement technique, the phase angle of a signal component of the intensity of the laser beam frequency comb is evaluated to determine a path length covered by the laser beam. The signal component is selected such that it oscillates with a frequency which corresponds to a typically large multiple of the repetition rate of the laser beam. Measuring a phase difference for such a signal component allows the position to be determined in a so called uniqueness range which is equal to the speed of light divided by the frequency of the signal component. To obtain an estimate for the path length that already approximates the path length to within the uniqueness range, in DE 10 2008 045 386.2 of the applicant it is proposed, for example, to evaluate different signal components of captured measured signals in a sequential manner, the different signal components oscillating with different frequencies. However, this requires additional time for measurement and evaluation.

It is an object of the invention to provide an improved evaluation device, an improved measuring arrangement and an improved method for path length measurement. In particular, it is an object of the invention to provide an evaluation device, a measuring arrangement and a method which allows a position to be determined rapidly with a good spatial resolution.

It is another object of the invention to provide such devices and methods which allow a position to be determined in a coordinate measuring device.

According to the invention, this object is attained by an evaluation device, a measuring arrangement, methods and a coordinate measuring device according to the independent claims. The dependent claims define advantageous or preferred embodiments.

According to an aspect, an evaluation device for path length measurement is provided, which is configured to evaluate a measured signal which represents an intensity of a sequence of pulses of electromagnetic radiation, in particular of a sequence of light pulses, as a function of time after the sequence has covered a path length to be measured. The sequence of pulses has a repetition rate. The evaluation device is configured to evaluate a first component of the measured signal, the first component oscillating with a first frequency, and a second component of the measured signal, the second component oscillating with a second frequency that is greater than the first frequency.

A spectral component of the measured signal, i.e. of the captured light intensity as a function of time, is herein referred to as a component of the measured signal which oscillates with a frequency. For example, the component oscillating with the frequency may be the component of a Fourier representation of the measured signal which oscillates with the respective frequency.

As the evaluation device is configured to evaluate the first component and the second component which oscillate with different frequencies, it is possible that both a coarse estimate and an improved finer estimate for the path length are determined by evaluating the different components of the measured signal.

The evaluation device may be configured such that the first frequency corresponds to the repetition rate or to a multiple of the repetition rate. The evaluation device may be configured such that the second frequency corresponds to another multiple of the repetition rate. The measured signal which represents the intensity of the sequence of pulses, in particular of light pulses, has such spectral components which can be evaluated for a path length measurement.

The evaluation device may be configured to determine a first phase difference associated with the first component of the measured signal and a second phase difference associated with the second component of the measured signal, to determine the path length. The first and second phase difference is dependent on the path length covered by the sequence of pulses relative to a reference position and allow the path length to be determined.

The evaluation device may be configured such that the first phase difference is a phase difference between the first component of the measured signal and a first reference signal which oscillates with the first frequency, and that the second phase difference is a phase difference between the second component of the measured signal and a second reference signal which oscillates with the second frequency. The reference signals may be determined from a captured intensity of a reference beam, for example. The phase differences reflect the differences in path length between the path length covered by the sequence of light pulses and the path length covered by the reference beam.

The evaluation device may be configured to down-convert at least the second component of the measured signal to determine the second phase difference. The evaluation device may comprise a mixer, to generate a down-converted signal which oscillates with the first frequency by down-converting the second component. The evaluation device may comprise at least two mixers to down-convert the second component in a plurality of stages. By virtue of the down-conversion, determination of the phase difference may be facilitated and the phase resolution may be enhanced, respectively, for example when the phase difference is determined based on an interval between successive zero passages of the second component and of the second reference signal.

The evaluation device may be configured to down-convert the first components of the measured signal and the second component of the measured signal to generate a first down-converted signal and a second down-converted signal, which respectively oscillate with a frequency that is less than the repetition rate. Suitable devices and methods for this purpose are described in detail in the German patent application DE 10 2009 024 460.3 entitled "Auswerteeinrichtung, Messanordnung and Verfahren zur Weglängenmessung" (Evaluation device, measuring arrangement and method for path length measurement) of the applicant, filed on the same day. By virtue of the down-conversion, determination of the phase difference may be facilitated and the phase resolution may be enhanced, respectively.

The evaluation device may comprise a first signal processing path for processing the first component of the measured signal and a second signal processing path for processing the second component of the measured signal. This configuration allows the first component and the second component of the measured signal to be processed simultaneously in the first and second signal processing paths.

The evaluation device may comprise an evaluation logic which is configured to determine a first estimate for the path length based on an evaluation of the first component of the measured signal, and to determine an estimate for the path length which is refined compared to the first estimate based on an evaluation of the second component of the measured signal. For example, the number of full wavelengths of the second component which are contained in the path length that contributes to the phase difference of the second component may be determined based on the evaluation of the first component. Thereby, the path length may be estimated with a precision which at least corresponds to the uniqueness range for the second component. For this purpose, the evaluation device may be configured such that the first estimate for the path length approximates the path length with an inaccuracy which is less than a quotient of a speed of light and the second frequency.

The evaluation logic may be configured to determine the first estimate based both on the evaluation of the first component of the measured signal and the evaluation of the second component of the measured signal. Thus, it can be ensured that the first estimate is also consistent with regard to the phase angle of the second component of the measured signal.

According to another aspect, a measuring arrangement for a path length measurement is provided. The measuring arrangement comprises a detector, which is configured to capture an intensity of a sequence of pulses of electromagnetic radiation, in particular of a sequence of light pulses, as a function of time after the sequence has covered a path length to be measured, with the sequence of pulses having a repetition rate. The detector is configured to provide a measured signal which represents the captured intensity. The measuring arrangement further comprises an evaluation device coupled to the detector to process the measured signal provided by the detector, with the evaluation device being configured as an evaluation device according to an aspect or embodiment of the invention.

The measuring arrangement may comprise a light source for generating the sequence of pulses. The light source may comprise a laser, in particular a short pulse laser. The light source may comprise an optical frequency comb generator. Optical frequency combs may have a high frequency and phase stability and are therefore suitable for use as light sources.

According to another aspect, a method for path length measurement is provided. In the method, a measured signal is captured and evaluated, the measured signal representing an intensity of a sequence of pulses of electromagnetic radiation, in particular of a sequence of light pulses, as a function of time after the sequence has covered a path length to be measured. The sequence of pulses has a repetition rate. To measure the path length, a first component of the measured signal, the first component oscillating with a first frequency, and a second component of the measured signal, the second component oscillating with a second frequency that is greater than the first frequency, are evaluated.

As both the first component and the second component of the measured signal are evaluated, it is possible to determine both a coarse estimate and an improved finer estimate for the path length by evaluating the first and second components of the measured signal.

The first component and the second component may in particular be evaluated simultaneously. The evaluation may comprise determining phase differences. The first component and/or the second component may be down-converted to determine a first phase difference and a second phase difference which are associated with the first component and the second component, respectively.

The effects of the further features of the method recited in the dependent claims correspond to the effects of the corresponding features of the evaluation device or of the measuring arrangement.

The evaluation device, the measuring arrangement and the method according to the aspects and embodiments may be configured to determine a distance of an object from a reference position. For this purpose, a configuration may be chosen in which the sequence of pulses of electromagnetic radiation travels twice through the path between reference position and object. For example, a reflector may be provided on the object to reflect the sequence of pulses of electromagnetic radiation. It is also possible that a configuration is chosen in which the detector is provided on the object or in which the sequence of light pulses is emitted from the object.

The evaluation device, the measuring arrangement and the method according to the different aspects and embodiments mentioned above may also be used to determine the distances of an object from plural reference positions, or to determine the distances of plural regions of the object which are spaced from each other, relative to a reference position. It is then possible to determine the position and/or orientation of the object in a space from the determined distances, using trilateration, for example. An exemplary field of application is the determination of a position of a measuring head of a coordinate measuring device.

According to another aspect of the invention, a measuring arrangement for determining a position of a measuring head of a coordinate measuring device is provided. This measuring arrangement comprises an evaluation device which is configured to evaluate a measured signal that represents an intensity of an amplitude modulated signal of electromagnetic radiation which has a repetition rate, in particular of a sequence of light pulses having a repetition rate, as a function of time, after the signal has travelled through a path between a reference position and the measuring head.

The position of the measuring head may, for example, be determined optically, e.g. relative to a frame of the coordinate measuring device, because the measuring arrangement allows a measured signal to be evaluated which represents the intensity of a signal of electromagnetic radiation to determine the position of the measuring head. This allows the position of the measuring head to be determined with a high accuracy using the measuring arrangement, even if a play may be present in the mechanics of the coordinate measuring device.

The evaluation device may be configured to evaluate the measured signal in response to a trigger signal, to determine or store the position of the measuring head.

The measuring head may for example be formed as a probe head of the coordinate measuring device which carries a stylus.

The evaluation device may be configured to determine a phase angle of a component of the measured signal to determine at least one coordinate of the measuring head, the component oscillating with the repetition rate or a multiple of a repetition rate. For a sequence of light pulses, for example, having a repetition rate, the captured measured signal has corresponding spectral components, the phase angle of which can be evaluated to determine a path length covered by the sequence of light pulses.

The measuring arrangement may comprise a sensor, in particular an optical or tactile sensor, to generate the trigger signal. The sensor may be configured to generate the trigger signal when the measuring head is located at a predetermined position relative to an object surface. The sensor may be configured to be arranged at the measuring head. The sensor may be coupled to a stylus provided at the measuring head, for example, to output the trigger signal when the stylus touches an object surface.

The measuring arrangement may be configured such that plural path lengths, in particular path lengths of at least three propagation paths of electromagnetic signals which are not located in one plane, between one or plural reference positions and one or plural regions of the measuring head are determined and evaluated. A detector device may be provided to capture the intensity of the signal of electromagnetic radiation after the signal has travelled through the path between the reference position and the measuring head, and to provide the measured signal. The detector device may be configured to capture the measured signal and at least one other measured signal in a time sequential manner, wherein the at least one other measured signal represents an intensity of another signal of electromagnetic radiation after the other signal has travelled through another path. To this end, a shutter or time-variable filter, such as a filter wheel, may be provided, for example, to capture signals which have travelled through different paths in a sequential manner. In another embodiment, plural detector devices may be provided to capture signals which have travelled through different paths.

The measuring arrangement may comprise an optical fiber, such as a glass fiber or a plastic fiber, an end of which is mountable to the measuring head. The other end of the optical fiber may be coupled to the detector device. This allows that the sequence of light pulses which is generated by a light source, such as a short pulse laser, is coupled into the optical fiber at the measuring head and is guided to the detector device from there.

The other end of the optical fiber may also be coupled to the light source, e.g. to the short pulse laser. This allows the sequence of light pulses generated by the light source to be guided to the measuring head in the optical fiber and to be emitted there, with a detector device which may be located at a fixed location capturing the sequence of light pulses.

It is also possible that the ends of plural optical fibers are provided on the measuring head spaced from each other, to couple light irradiated onto the measuring head into the optical fibers at different locations, or to emit light from spaced positions at the measuring head.

It is also possible that at least one reflector which is mountable to the measuring head is provided. The reflector may be electrically switchable. The reflector may be configured as a retroreflector. The reflector allows a sequence of light pulses which is irradiated onto the measuring head to be reflected towards a detector. For this purpose, a configuration as described in DE 10 2008 045 386.2 of the applicant may be used, for example.

According to another aspect, a coordinate measuring device is provided which has a measuring head and a measuring arrangement for determining the position of the measuring head according to an aspect or embodiment.

In the coordinate measuring device, the position of the measuring head can be determined using the measuring arrangement by capturing and evaluating the amplitude modulated signal after it has travelled through a path between reference position and the measuring head. This allows the position of the measuring head to be determined using optical measuring techniques, relative to a frame of the coordinate measuring device, for example.

The coordinate measuring device may be configured as a bridge-type device. The coordinate measuring device may also comprise a robot arm, an end of which is configured as a measuring head.

According to another aspect, a method of operating a coordinate measuring device is provided. The coordinate measuring device comprises a measuring head. To determine a position of the measuring head, a measured signal is evaluated in the method, the measured signal representing an intensity of an amplitude modulated signal of electromagnetic radiation having a repetition rate, in particular of a sequence of light pulses having a repetition rate, as function of time after the signal has travelled through a path between a reference position and the measuring head.

The position of the measuring head may be determined optically, e.g. relative to a frame of the coordinate measuring device, for example, because the position of the measuring head is determined by evaluating a measured signal which represents the intensity of a signal of electromagnetic radiation in the method. Thereby, the position of the measuring head may be determined with a high precision, even when a play may be present in the mechanics of the coordinate measuring device.

The position of the measuring head may in particular be determined in response to a trigger signal. The trigger signal may be generated when the measuring head has a predetermined position relative to an object surface, for example when a stylus carried on the measuring head touches the object surface.

According to another aspect of the invention, a method of determining a position is provided. The method comprises determining a phase angle of a measured signal which represents an intensity of a sequence of light pulses as a function of time after the sequence has covered a path length to be measured, wherein the sequence of light pulses has a repetition rate, and wherein the sequence of light pulses is guided in an optical fiber, with an end of the optical fiber being attached at the location.

The other end of the optical fiber may be coupled to a light source, e.g. to a short pulse laser, such that the sequence of light pulses exits from the one end of the optical fiber at the position. The sequence of light pulses may be captured by a detector that is located at a fixed position, for example.

The other end of the optical fiber may also be coupled to a detector to guide the sequence of light pulses irradiated towards the position from the position to the detector.

The devices, arrangements and methods according to various embodiments of the invention may be used for path length measurement or position determination. An exemplary field of application is measurement applications in industrial plants, e.g. in automatic production or transportation plants. The embodiments of the invention are not limited to these applications, however.

In the following, the invention will be explained in more detail based on embodiments, with reference to the accompanying drawing.

In the following, embodiments of the invention will be explained in more detail. Features of the various embodiments may be combined with each other unless this is explicitly excluded in the following description. While some embodiments are described in the context of specific applications, such as determining a position in industrial installations, the invention is not limited to these applications.

The different embodiments are configured for a path length measurement in which a sequence of pulses of electromagnetic radiation travels through a path length to be measured. The sequence of pulses has an intensity or amplitude which repeats at a repetition rate. To perform the path length measurement, the pulses of the sequence are generated by a suitable device, e.g. by a short pulse laser, with a repetition rate, such that at a predetermined position of the beam path the amplitude and, thus, the power density or radiation intensity of the electromagnetic radiation has maxima repeating with the repetition rate.

Figure 1:
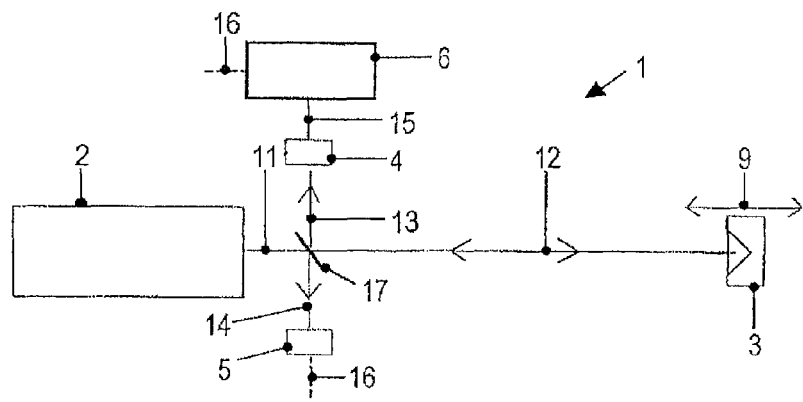
FIG. 1 is a schematic representation of a measuring arrangement according to an embodiment.

FIG. 1 is a schematic representation of a measuring arrangement 1 according to an embodiment. The measuring arrangement 1 comprises a light source 2, a reflector 3 to be mounted to an object, a detector 4 for capturing a measured signal, another detector 5 for capturing a reference signal, and an evaluation device 6. Further, a beam splitter 17 is provided to direct a reference beam 14 to the other detector 5 and to direct a measurement beam 12, 13 to the detector 4.

The light source 2 may be configured as a frequency comb generator having a short pulse laser. The light source 2 may in particular be configured to generate a signal having a high frequency stability and high phase stability. The light source 2 generates a sequence of light pulses with a repetition rate, as will be described in more detail with reference to FIG. 2.

The beam splitter 17 is arranged in a beam path 11 of the sequence of light pulses generated by the light source 2, to couple out a reference beam 14 towards the other detector 5. The partial beam 12 transmitted by the beam splitter 17 travels from the beam splitter 17 to the reflector 3, where it may be reflected back onto itself, for example, and directed to the detector 4. The detectors 4, 5 are configured as photodetectors which capture the intensity of the optical signals incident upon them and which output an electrical signal 15, 16 which represents the captured intensity.

The reference beam 14 coupled out by the beam splitter 17, which is directed to the other detector 5, covers a path length which is determined by the geometry of the measuring arrangement 1. The beam 12 transmitted by the beam splitter 17, which continues to the reflector 3 provided on the object, covers the path from the beam splitter 17 to the reflector 3 and back to the detector 4, the path length of which depends on the position of the object to which the reflector 3 is mounted. A varying position of the object is schematically indicated with arrow 9.

The different paths which are covered by the beam captured by the detector 4 and by the beam captured by the other detector 5 give rise to a time lag between the captured signals, which corresponds to the run-time delay. The run-time delay gives rise to a phase shift of components in the Fourier representation of the intensities 15 and 16 captured by the detector 4 and the other detector 5.

The evaluation device 6 is configured such that it evaluates a first component and a second component of the measured signal 15 captured by the detector 5, with the first component having a frequency which oscillates with the repetition rate or a multiple of the repetition rate, and with the second component having a frequency which is greater than the first frequency and which oscillates with a multiple of the repetition rate. The path length difference between the signals which are captured by the detector 4 and the other detector 5 is determined by determining the phase differences of the first and second components of the measured signal relative to the corresponding component of the reference signal. By determining the path length difference, the distance of the object to which the reflector 3 is mounted from a reference position, such as the beam splitter 17, may be determined, because a portion of the path length difference which is only dependent on the device geometry, e.g. due to the distance covered by the partial beam 14 from the beam splitter 17 to the detector 5, is either known or may be taken into account as an offset by calibrating the measuring arrangement.

The beam 12, 13 which travels from the beam splitter 17 via the reflector 3 to the detector 4, and which will be referred to as measurement beam in the following, possibly covers a distance which is significantly longer than that of the reference beam 14, which is coupled out to the other detector 5 by the beam splitter 17. The beam splitter 17 may be configured such that it transmits a comparatively large fraction, e.g. approximately 99%, of the intensity of the sequence of light pulses incident on it as a measurement beam 12, and directs only approximately 1% as reference beam 14 to the other detector 5.

The light source 2 generates an optical signal which is modulated with a periodic function and which has a fundamental frequency f0 as well as pronounced components of harmonics of the fundamental frequency f0, i.e. pronounced frequency components having frequencies which are multiples of f0. Such a signal is, for example, generated by a short pulse laser which generates a sequence of light pulses in a well-defined interval T0=1/f0, i.e. with a repetition rate f0, with the duration of each pulse being short compared to the interval T0 between successive pulses.

FIG. 2A exemplarily shows the intensity of such a sequence of short light pulses 21, wherein the output power P of the light source 2 is shown as a function of time t. The interval T0 between successive pulses is schematically indicated with reference sign 22, while the duration of each light pulse is schematically indicated with reference sign 23. The duration of each light pulse may be very short compared to the interval T0 between successive light pulses, for example on the order of $1 \cdot 10^{-5}$. While a sequence of square pulses is exemplarily shown in FIG. 2A, other suitable pulse shapes may also be chosen, for example a square of a hyperbolic secans or a Gauss function.

FIG. 2B exemplarily shows a frequency spectrum 25 of the intensity of a sequence of light pulses which is generated with a repetition rate f0, with the duration of each light pulse being short compared to T0=1/f0. The frequency spectrum 25 has a number of peaks at a constant frequency spacing f0, which is schematically indicated at reference sign 26. The spectral weight of the peaks decreases towards higher frequencies, the decrease rate being determined by the ratio of the time interval between successive light pulses and the light pulse duration. For the light source 2 of the device 1, these quantities are selected such that the spectral weight of the component 27 having frequency n·f0, which is used for determining a phase, is sufficiently large to perform a phase measurement.

Figure 2:
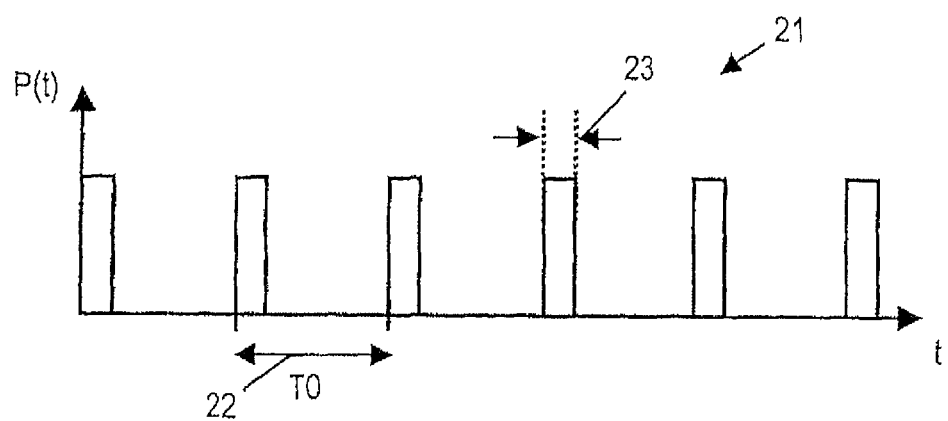
FIG. 2A shows exemplarily a sequence of light pulses as a function of time.
FIG. 2B shows schematically a Fourier-spectrum of the sequence of light pulses of FIG. 2A.
Figure 2:

A sequence of light pulses as schematically shown in FIG. 2 can be generated by various lasers which are configured for generating short light pulses. In particular, optical frequency synthesizers may be used. For example, an electrically pumped diode laser, such as a q-switched laser, a gain-switched laser, an active or passive mode-locked laser or a hybrid mode-locked laser, or a mode-locked surface emitting laser having a vertical cavity ("vertical-cavity surface emitting laser", VCSEL) may be used as a light source 2. An optically pumped laser may also be used as light source 2, for example a passive mode-locked surface emitting laser having an external vertical cavity ("vertical external cavity surface emitting lasers", VECSEL) or a laser based on a photonic-crystal-fiber (photonic-crystal-fiber laser). Exemplary pulse durations of the light source 2 lie in a range from 100 fs to 100 ps. Exemplary repetition rates lie in a range from 50 MHz to 50 GHz. Exemplary average powers lie in a range from 1 mW to 10 W. Exemplary values for the pulse jitter lie between 10 fs and 1 ps effective value (square mean).

In a Fourier representation, the intensity of the measurement beam 12, 13 captured by the detector 4 has the spectral representation $$P_M(t) = \Sigma_i b_i \cdot \cos(2 \cdot \pi \cdot i \cdot f0 \cdot t + \phi_{M,i}), \quad (1)$$

where the summation index i runs over the natural numbers with 0, f0 is the repetition rate, $b_i$ is the spectral weight of the spectral component having frequency i·f0, t is the time and $\phi_{M,i}$ is a phase of the spectral component having frequency i·f0, which may be due to the path length covered by the measurement beam 12, 13 from the point where it is separated from the reference beam 11, to the detector 4, for example.

In a Fourier representation, the intensity of the reference beam captured by the other detector 5 has the spectral representation $$P_R(t) = \Sigma_i a_i \cdot \cos(2 \cdot \pi \cdot i \cdot f0 \cdot t + \phi_{R,i}), \quad (2)$$

for example, where the summation index i runs over the natural numbers with 0, f0 is the repetition rate, $a_i$ is the spectral weight of the spectral component having frequency i·f0, t is the time and $\phi_{R,i}$ is a phase of the spectral component having frequency i·f0, which takes into account the path length covered by the reference beam from the point where it is coupled out from the measurement beam, to the other detector 5.

The path length difference between the path lengths covered by the reference beam and the measurement beam, or the run-time delay τ corresponding to the path length difference between a light pulse in the measurement beam and the corresponding light pulse in the reference beam, gives rise to a phase shift or phase difference $$\Delta \phi_i = \phi_{M,i} - \phi_{R,i} \quad (3)$$

between the components of the signals $P_M(t)$ and $P_R(t)$ which oscillate with a frequency $f_i = i \cdot f0$. The modulus of the phase difference is proportional to the time shift τ between the intensities captured by the detector 4 and the other detector 5, $$|\Delta\phi_i|=2\cdot\pi\cdot i\cdot f0\cdot\tau=2\cdot\pi\cdot f_i\cdot d/c. \quad (4)$$

Here, d denotes a path length difference between the measurement beam and the reference beam, and c denotes the speed of light. Phase angles are specified in radian measure, unless another measure is explicitly stated. The term "phase difference" will also be used to refer to the modulus of the phase difference in the following, because only the modulus of the phase difference is relevant to determine the path length difference (which is defined to be positive).

The path length difference d differs from the variable path length, between the beam splitter 17 via the reflector and back to the beam splitter 17, which is of interest, only by a constant summand which depends on the geometry of the measuring arrangement and is either known in advance or can be determined by calibration. Therefore, the path length difference d will also be referred to as path length to be measured hereinafter.

According to Equation (4), the path length difference between the signals, d, and thus the path length to be measured, may be determined from a measured phase difference. For a given phase resolution, i.e. measurement accuracy for the phase difference, the evaluation of a component having a higher frequency $f_i$ leads to a higher spatial resolution. As described in DE 10 2008 045 386.2 and DE 10 2008 045 387.0, for example, high harmonics having frequencies $f_i\gg f0$, for example, may be evaluated to accurately determine the path length.

Phase differences can be determined uniquely only within an interval having a length of 2·π. To determine the path length to be measured, d, based on the phase difference between the components of the measured signal and of the reference signal, which oscillate with a frequency $f_i$, an estimate for the path length is required which, for example, approximates the path length with an accuracy of $$\lambda_i=c/(i\cdot f0)=c/f_i \quad (5)$$

The evaluation device 6 is configured such that it evaluates a first component and a second component of the measured signal 15. A first estimate for the path length d is determined from the phase angle of the first component of the measured signal, which oscillates with the repetition rate or a multiple of the repetition rate. A refined second estimate for the path length d is determined from the phase angle of the second component of the measured signal, which oscillates with a multiple of the repetition rate $f_n=n\cdot f0$ that is greater than the frequency of the first component.

Figure 3:
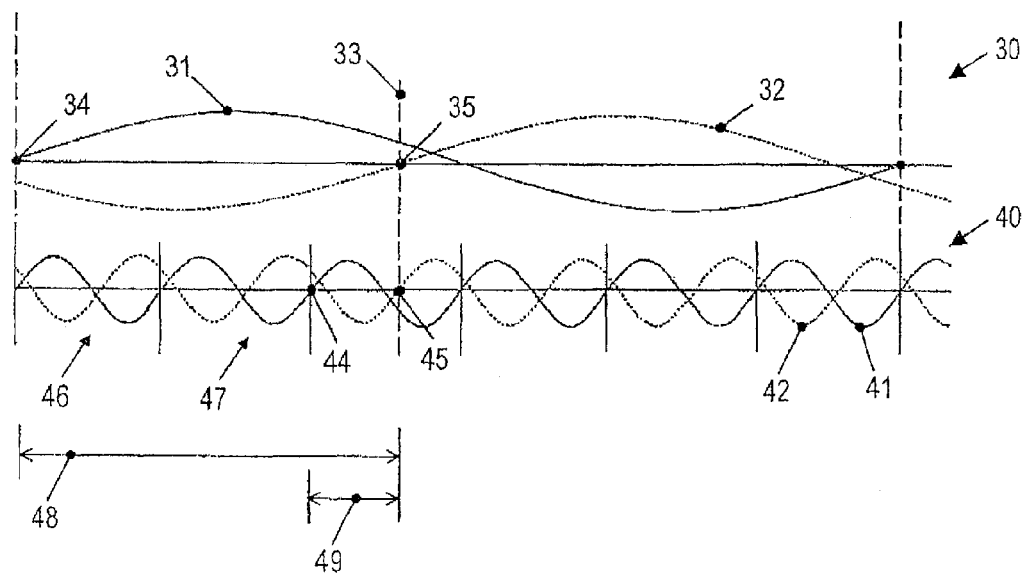
FIG. 3 shows schematically signals which are evaluated in an evaluation device according to an embodiment.

For illustration, FIG. 3 shows at 30 a first component 32 of the measured signal and a first component 31 of the reference signal as a function of time, which oscillate with the repetition rate $f_1=f0$, for example. The path length to be measured, d, or the path length difference d caused by the different distances covered by the optical signals gives rise to a time shift τ between the first components 32, 31 of the measured and reference signals, which is schematically shown at 33 and which corresponds to an interval between a zero passage 34 of the component 31 of the reference signal and the successive zero passage 35 of the component 32 of the measured signal in the same direction. The run-time delay τ gives rise to a phase difference $|\Delta\phi_1|=2\cdot\pi\cdot f0\cdot\tau$ which is associated with the first component of the measured signal. By measuring $|\Delta\phi_1|$, a first estimate for the run-time delay τ and, according to Equation (4), for the path length to be measured, d, may be determined.

FIG. 3 shows at 40 a second component 42 of the measured signal and a second component 41 of the reference signal as a function of time, which oscillate with a multiple of the repetition rate, e.g. with a frequency $f_6=6\cdot f0$. By evaluating the second component 42 of the measured signal, the phase difference between the second components 41, 42 of the measured signal and of the reference signal may be determined in a uniqueness range for a phase angle measurement, which may be selected as interval from 0 to 2·π, for example. The phase difference in the uniqueness range corresponds to the phase shift between the zero passage of the second component 41 of the reference signal, designated by 44, and the value of the second component 42 of the measured signal, designated by 45, at the position or at the time at which the first component 32 of the measured signal has its zero passage 35, and which is determined by the run-time delay τ.

When the path length to be measured, d, is greater than the wavelength $\lambda_n$ of the component of the measured signal which oscillates with the frequency $f_n$, the phase shift in the uniqueness range which can be measured differs from the phase difference given by Equation (4) by an integral multiple of 2·π. As illustrated in FIG. 3, the phase shift in the uniqueness range from 0 to 2·π, shown at 49, does not correspond to the phase difference 48 given by Equation (4), because the portion of the phase difference 48 which corresponds to two complete periodic cycles 46, 47 cannot be measured from the oscillating components 41, 42 of the reference signal and measured signal.

The evaluation device 6 according to an embodiment allows a first component of the measured signal, which oscillates with a first frequency $f_p=p\cdot f0$, to be evaluated, to determine the number of complete periodic cycles of the second component of the measured signal which are contained in the path length to be measured, d, with the second component oscillating with a second frequency $f_n=n\cdot f0$. Here, p and n are natural numbers, with n>p.

In an embodiment, the phase difference $|\Delta\phi_p|$ associated with the first component of the measured signal is determined by the evaluating device 6. According to Equation (4), $$d_p=\lambda_p\cdot|\Delta\phi_p|/(2\cdot\pi) \quad (6)$$

is a first estimate for the path length to be measured.

The count q of the full periods or full wavelengths $\lambda_n$, respectively, of the second component of the measured signal in the path length to be measured, d, may be estimated by $$q=\text{Floor}[(\lambda_p/\lambda_n)\cdot|\Delta\phi_p|/(2\cdot\pi)], \quad (7)$$

where Floor (·) denotes the floor function or Gauss bracket, respectively, which has a value that corresponds to the largest integer number which is less than or equal to the argument of the function. Said differently, the value of the floor function corresponds to the integral portion of its argument.

The evaluation device 6 is further configured to determine the second phase difference $|\Delta\phi'_n|$, which is associated with the second component of the measured signal in the uniqueness range. The uniqueness range is, for example, defined such that the second phase difference $|\Delta\phi'_n|$ has a value in the interval from 0 to 2·π, for example. The phase difference $|\Delta\phi'_n|$ in the uniqueness range and the count q of the full periods or wavelengths $\lambda_n$ allow the phase difference given by Equation (4) to be determined according to $$|\Delta\phi_n|=2\cdot\pi q+|\Delta\phi'_n|, \quad (8)$$

which takes into account the number of lapsed complete periodic cycles.

The path length to be measured may be determined from the phase angles $|\Delta\phi_p|$ and $|\Delta\phi'_n|$ determined by the evaluation device 6, according to $$d = q \cdot \lambda_n + \lambda_n \cdot |\Delta\phi'_n|/(2\cdot\pi) \quad (9)$$

$$= \text{Floor}[(\lambda_p/\lambda_n)\cdot|\Delta\phi_p|/(2\cdot\pi)]\cdot\lambda_n + \lambda_n \cdot |\Delta\phi'_n|/(2\cdot\pi). \quad (9')$$

The first summand on the right-hand side of Equation (9), which depends on the first phase difference $|\Delta\phi_p|$ which is associated with the first component of the measured signal, is a first estimate for the path length to be measured. The second summand on the right-hand side of equation (9), which depends on the second phase difference $|\Delta\phi'_n|$ which is associated with the second component of the measured signal, provides a refined second estimate for the path length to be measured, within the interval which is set by the first summand on the right-hand side of equation (9).

The evaluation device 6 is configured such that the first phase difference $|\Delta\phi_p|$ which is associated with the first component of the measured signal can be resolved with an accuracy which is sufficient to determine the count of wavelengths $\lambda_n$ of the second component within the path length to be measured. For this purpose, the evaluation device may be configured such that the phase difference $|\Delta\phi_p|$ can be measured with a resolution of $2\cdot\pi\cdot p/n$, i.e., that the angle range from 0 to $2\cdot\pi$ may be resolved in at least n/p steps.

The evaluation device 6 may further be configured such that the path length to be measured is already known with an accuracy of $\lambda_p$, and $|\Delta\phi_p|$ lies within the uniqueness range from 0 to $2\cdot\pi$. For this purpose, p may be suitably selected. It is also possible that a coarse estimate for the path length to be measured is first determined using another measuring arrangement, for example using ultrasound, to then refine the rough estimate based on the measurement of $|\Delta\phi_p|$ with an accuracy which is sufficient to determine the count of wavelengths $\lambda_n$ of the second component of the measured signal within the path length to be measured, d.

As will be explained in more detail with reference to FIG. 8-10, the evaluation device 6 may also be configured such that the quantity q determined in accordance with Equation (7) is subject to a consistency check, in which the second phase difference $|\Delta\phi'_n|$ associated with the second component of the measured signal is taken into account. The count of wavelengths $\lambda_n$ of the second component in the path length to be measured, d, may therefore be determined both based on the first phase difference associated with the first component of the measured signal and on the second phase difference associated with the second component of the measured signal.

For further illustration it will exemplarily be assumed that the light source 2 generates light pulses with a repetition rate of f0=100 MHz, and that the first component of the measured signal oscillates with a frequency $f_1$=f0, i.e., that it corresponds to the fundamental wave, while the second component of the measured signal oscillates with a frequency $f_{240}$=240·f0=24 GHz. Then, $\lambda_1$=3 m and $\lambda_{240}$=1.25 cm. It is further assumed that the phase resolution in the measurement of $|\Delta\phi_1|$ and $|\Delta\phi'_{240}|$ is respectively $2\cdot\pi/1000$, so that an angle interval from 0 to $2\cdot\pi$ may be resolved in thousand steps. If the evaluation device 6 determines, for example, a first phase difference $|\Delta\phi_1|$=136° (in degrees), this corresponds to a first estimate for the path length to be measured of 3 m·136°/360°=1.133[33] m, with the non-significant digits being given in square brackets. Using Equation (7), the count of wavelengths $\lambda_{240}$ in the path length to be measured is given as q=Floor[240·136°/360°]=90. If a value of $|\Delta\phi'_{240}|$=238° (in degrees), for example, is determined for the second phase difference associated with the second component of the measured signal, the second summand on the right-hand side of Equation (9) has the value 1.25 cm·238°/360°=0.82638 cm. Based on Equation (9), the path length to be measured is given as d=90·1.25 cm+0.82638 cm=113.3263 cm.

For further illustration of a consistency check of the quantity q determined in accordance with Equation (7), a situation is considered in which the path length to be measured, d, is approximately equal to an integer multiple of $\lambda_{240}$, using the above parameters, i.e. based on the assumption that the light source 2 generates light pulses with a repetition rate of f0=100 MHz and that the first component of the measured signal oscillates with a frequency $f_1$=f0 while the second component of the measured signal oscillates with a frequency $f_{240}$=240·f0=24 GHz. If, for example, a phase difference $|\Delta\phi_1|$=105° (in degrees) is determined by the evaluation device, this corresponds to a first estimate for the path length to be measured of 3 m·105°/360°=0.875 m. Within the resolution achievable with the measurement of $|\Delta\phi_1|$, this value is equal to 70·$\lambda_{240}$. To determine the correct count of wavelengths $\lambda_{240}$ in the path length to be measured, the measured value determined by the evaluation device 6 for the second phase difference $|\Delta\phi'_{240}|$ associated with the second component of the measured signal may be used when determining q. If $|\Delta\phi'_{240}|$ has a small value, such as $|\Delta\phi'_{240}|$=2° (in degrees), for example, q=70 is the correct count of wavelengths $\lambda_{240}$ in the path length to be measured, and the path length d according to Equation (9) is given by 0.875 m+1.25 cm·2°/360°=0.875 m+0.00694 cm=87.50694 cm. However, if $|\Delta\phi'_{240}|$ has a value which, for example, is only slightly less than 360°, e.g. $|\Delta\phi'|$=359° (in degrees) q=70 will be inconsistent with the large value of $|\Delta\phi'_{240}|$, so that q=69 is the correct count of wavelengths $\lambda_{240}$ in the path length to be measured. In this case, the path length d is given, according to Equation (9), by 69·1.25 cm+1.25 cm·359°/360°=86.25 cm+1.24652 cm=87.49652 cm. The consistency check of q based on the phase difference determined for the second component will be described in more detail with reference to FIGS. 8-10.

Evaluation devices according to various embodiments will be described in more detail with reference to FIG. 4-7.

Figure 4:
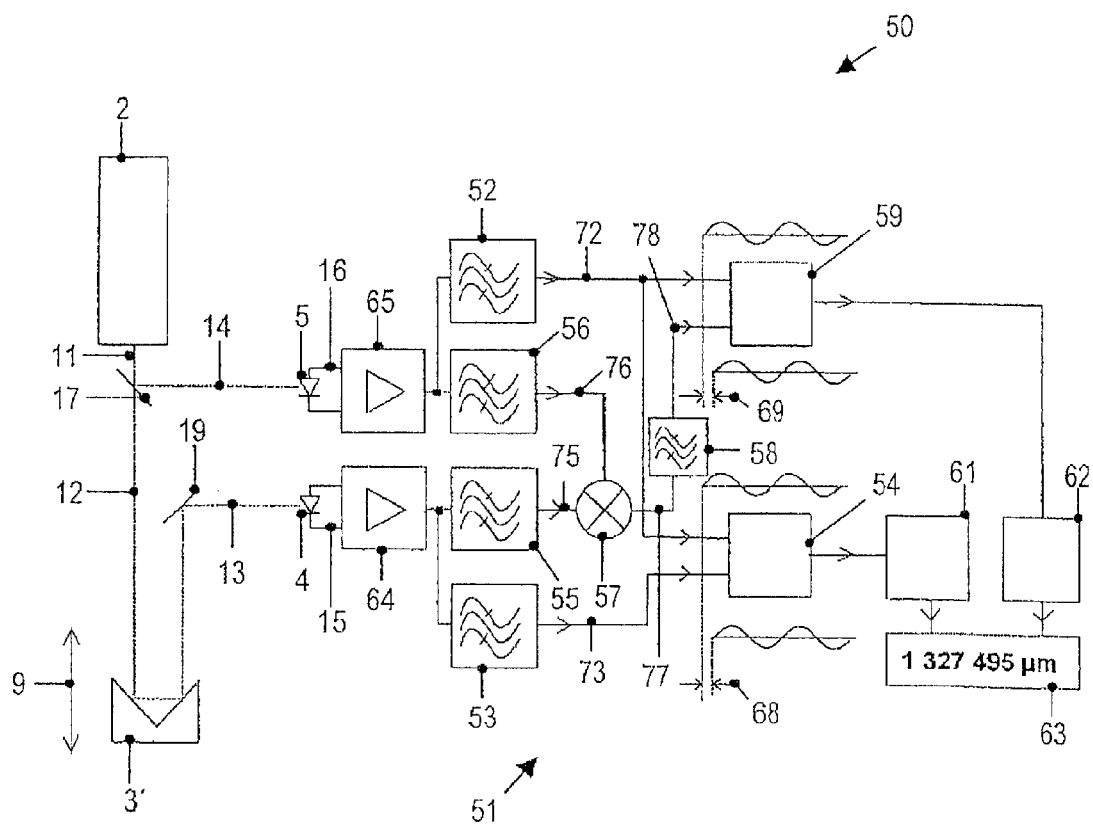
FIG. 4 is a schematic representation of a measuring arrangement according to an embodiment.

FIG. 4 is a schematic representation of a measuring arrangement 50. The measuring arrangement 50 comprises a light source 2, a reflector 3' to be mounted to an object, a beam splitter 17 and a deflecting mirror for directing a reference beam 14 and a measurement beam 12, 13, a photodetector 4 for capturing an intensity of the measurement beam 12, 13 as a function of time, and another photodetector 5 for capturing an intensity of the reference beam 14 as a function of time. These elements and devices correspond with regard to their function and configuration to the corresponding elements and devices of the measuring arrangement 1 of FIG. 1 and are designated with the same or similar reference numerals, so that additional reference is made to the description of the measuring arrangement 1.

In the measuring arrangement 50, the light source 2 generates a sequence of light pulses with a repetition rate f0. The photodetectors 4 and 5 may have different conversion factors to take into account that the measurement beam 12, 13 must cover a longer distance than the reference beam 14. For example, the photodetector 4 for the measurement beam may have a conversion factor of 500 V/W, while the other photodetector 5 for the reference beam may have a conversion factor of 150 V/W.

The measuring arrangement 50 comprises an evaluation device 51. The evaluation device 51 may be used as evaluation device 6 in the measuring arrangement 1 of FIG. 1. The evaluation device 51 is configured to determine a first phase difference which is associated with a first component of the measured signal 15 captured by the photodetector 4, which first component oscillates with a first frequency, and a second phase difference associated with a second component of the measured signal 15 captured by the photodetector 4, which second component oscillates with a second frequency. In this case, the first frequency is equal to the repetition rate or an integer multiple of the repetition rate, and the second frequency is equal to an integer multiple of the repetition rate and is greater than the first frequency.

The evaluation device 51 comprises an input amplifier 64 which receives the measured signal 15 from the photodetector 4, which represents the intensity of the sequence of light pulses in the measurement beam 12, 13. The evaluation device 51 comprises another input amplifier 65 which receives the reference signal 16 from the other photodetector 5, which represents the intensity of the sequence of light pulses in the reference beam.

The evaluation device 51 has a first signal processing path for the first component of the measured signal 15, which first component oscillates with a first frequency $f_p = p \cdot f0$, where $p \geq 1$ is an integer number. The first signal processing path comprises a band pass filter 53 and a phase measurement device 54. An input of the band pass filter 53 is coupled to an output of the amplifier 64 to receive the amplified measured signal 15. The band pass filter 53 has a pass band which comprises the frequency $f_p$. The band pass filter 53 may be configured such that components of the measured signal having frequencies $(p-1) \cdot f0$ and $(p+1) \cdot f0$ are strongly attenuated compared to the first component having the frequency $f_p$. The band pass filter 53 may have a pass band having a width which is less than f0. In this case, the output signal 73 of the band pass filter 53 essentially corresponds to the first component of the measured signal which oscillates with the first frequency $f_p$. The first component of the measured signal may for example be written in the form $U_{M,p} \cdot \cos(2 \pi \cdot f_p \cdot t + \phi_{M,p})$, with $U_{M,p}$ being an amplitude of the first component and $\phi_{M,p}$ being the phase angle of the first component of the measured signal. The first component 73 of the measured signal is supplied to the phase measurement device 54 which determines a phase difference between the first component 73 of the measured signal and a first oscillating reference signal 72 which oscillates with the same frequency $f_p$ as the first component 73 of the measured signal.

The evaluation device 51 has a band pass filter 52. An input of the band pass filter 52 is coupled to an output of the amplifier 65 to receive the amplified reference signal 16. The band pass filter 52 has a pass band which comprises the frequency $f_p$. The transmission characteristics of the band pass filter 52 may correspond to the one of the band pass filter 53. In particular, the band pass filter 52 may have a pass band having a width which is less than f0. The output signal of the band pass filter 52 is the first oscillating reference signal 72, which oscillates with the same frequency $f_p$ as the first component 73 of the measured signal.

The phase measurement device 54 is coupled to an output of the band pass filter 53 to receive the first component 73 of the measured signal, and is coupled to an output of the band pass filter 52 to receive the first oscillating reference signal 72. The phase measurement device 54 is configured to determine a first phase difference, schematically indicated at 68, between the first component 73 of the measured signal and the first oscillating reference signal 72.

The evaluation device 51 has a second signal processing path for the second component of the measured signal 15, which second component oscillates with a second frequency $f_n = n \cdot f0$, where n is an integer number and n>p. The second signal processing path comprises a band pass filter 55, a mixer 57, a band pass filter 58 to filter an output signal of the mixer 57 and a phase measurement device 59. An input of the band pass filter 55 is coupled to an output of the amplifier 64 to receive the amplified measured signal 15. The band pass filter 55 has a pass band which comprises the frequency $f_n$. The band pass filter 55 may be configured such that components of the measured signal having frequencies $(n-1) \cdot f0$ and $(n+1) \cdot f0$ are strongly attenuated compared to the second component having the frequency $f_n$. The band pass filter 55 may have a pass band having a width which is less than f0. In this case, an output signal 75 of the band pass filter 55 essentially corresponds to the second component of the measured signal which oscillates with the second frequency $f_n$. The second component of the measured signal may for example be written in the form $U_{m,n} \cdot \cos(2 \pi \cdot f_n \cdot t + \phi_{M,n})$, with $U_{M,n}$ being an amplitude of the and $\phi_{M,p}$ being the phase angle of the second component of the measured signal.

The second component 75 of the measured signal is down-converted to generate a down-converted signal which oscillates with the frequency $f_p$. For this purpose, the second component 75 of the measured signal is supplied to the mixer 57. Another input of the mixer 57 is coupled to an output of a band pass filter 56. An input of the band pass filter 56 is coupled to the amplifier 65 to receive the amplified reference signal 16 therefrom. The band pass filter 56 has a pass band which comprises the frequency $f_{n-p}$. The band pass filter 56 may have a pass band having a width which is less than f0. An output signal 76 of the band pass filter 56, which is supplied to the mixer 57, essentially corresponds to the component of the reference signal 16 which oscillates with a frequency $f_{n-p}$.

An output signal 77 of the mixer 57 has a component which oscillates with the frequency sum $f_n + f_{n-p}$ and a component oscillating with the frequency difference $f_n - f_{n-p} = f_p$ of the input signals of the mixer 57. The output signal 77 of the mixer 57 is supplied to a band pass filter 58. The band pass filter 58 is configured such that the component of the output signal 77 of the mixer 57 which oscillates with the frequency $f_p$ is allowed to pass and that the component oscillating with the sum frequency is strongly attenuated relative thereto. An output signal 78 of the band pass filter 58 is the down-converted signal which oscillates with the frequency $f_p$, which is generated by down-converting the second component 75 of the measured signal.

The phase measurement device 59 is coupled to an output of the band pass filter 58 to receive the output signal 78 of the band pass filter 58, and is coupled to the output of the band pass filter 52 to receive the first oscillating reference signal 72. The phase measurement device 59 is configured to determine a second phase difference, schematically indicated at 69, between the output signal 78 of the band pass filter 58 and the first oscillating reference signal 72.

Signals 72, 78 which oscillate with the first frequency $f_p$ are supplied to the phase measurement device 59 in the second signal processing path for the second component of the measured signal. The second component 75 of the measured signal is mixed by the mixer 57 with a spectral component 76 of the reference signal 16 which has a well-defined phase relation with the other spectral components of the reference signal. Therefore, the phase difference determined by the second phase measurement device 59 is equal to the phase difference between the component 75 of the measured signal which oscillates with the second frequency $f_p$ and a second oscillating reference signal, which corresponds to the component of the reference signal 16 oscillating with the second frequency $f_n$. The configuration of the evaluation device 51, which may correspond to that of a super heterodyne receiver, allows the second phase difference, which is associated with the second component 75 of the measured signal 15, to be determined, without it being required that the component of the reference signal 16 which oscillates with the second frequency is generated, such as by filtering the reference signal 16. The down-conversion of the second component 75 of the measured signal 15 makes it possible that the phase measurement in the phase measurement device 59 is performed at the lower frequency $f_p$.

The evaluation device 51 has an evaluation logic 61-63. A first estimation device 61 of the evaluation logic is coupled to the phase measurement device 54 of the first signal processing path to determine a first estimate for the path length to be measured, based on the first phase difference $|\Delta\phi_p|$ determined by this phase measurement device. The first estimate may correspond to the first summand on the right-hand side of Equation (9). A second estimation device 62 of the evaluation logic is coupled to the phase measurement device 59 of the second signal processing path to determine a correction of the first estimate for the path length to be measured, based on the second phase difference $|\Delta\phi'_n|$ determined by this phase measurement device. The correction of the first estimate may correspond to the second summand on the right-hand side of Equation (9). A suitable interface 63, e.g. a display, a USB interface or another interface, may be provided to output the first estimate determined by the first estimation device 61 and the improved estimate for the path length determined by the second estimation device 62, for example to a computer.

The evaluation device 51 is configured such that it evaluates a component of the measured signal oscillating with a first frequency $f_p$ and a component of the measured signal oscillating with a second frequency $f_n$. The evaluation device 51 may in particular be configured such that $\lambda_p=c/f_p$ is greater than an initial uncertainty of the path length to be measured. The evaluation device 51 may be configured such that the estimate for the path length to be measured, which is obtained by evaluating the first component of the measured signal, approximates the path length to be measured with a resolution which is less than or equal to $\lambda_n=c/f_n$.

In an embodiment, the light source 2 may generate light pulses with a repetition rate f0=100 MHz, for example. The evaluation device 51 may be configured such that it evaluates the first component of the measured signal oscillating with the frequency $f_1$=f0 (p=1) and the second component of the measured signal oscillating with the frequency $f_{240}$=240·f0 (n=240). Correspondingly, the band pass filters 52 and 53 may have a pass band at a frequency of 100 MHz, the band pass filter 55 may have a pass band at a frequency of 24 GHz, and the band pass filter 56 may have a pass band at a frequency of 23.9 GHz.

Figure 5:
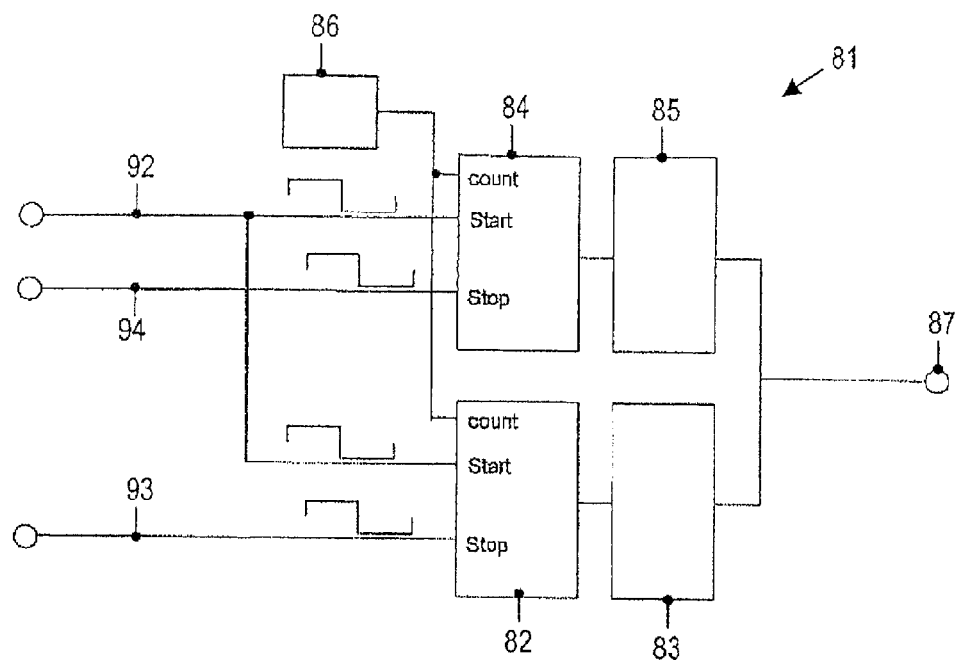
FIG. 5 shows an implementation of a phase measurement device for an evaluation device according to an embodiment.
Figure 6:
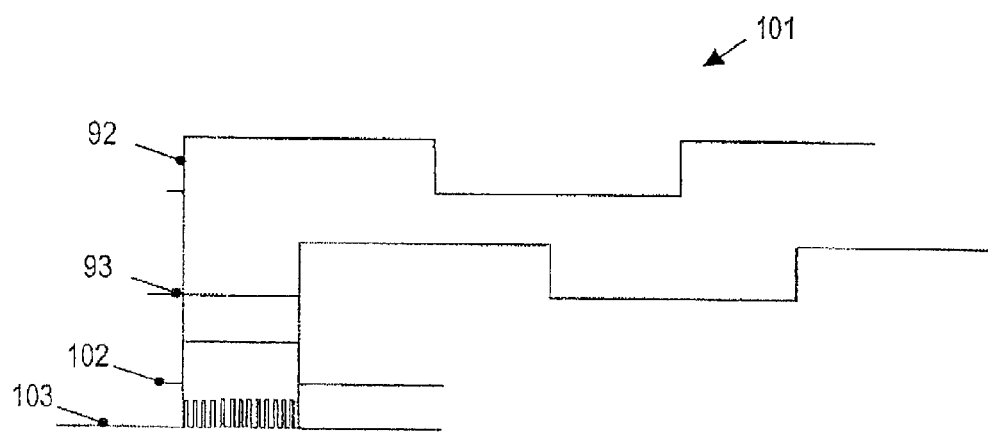
FIG. 6 shows signals which occur in the phase measurement device of FIG. 5.

With reference to FIGS. 5 and 6, a possible configuration of the phase measurement devices 54, 59 will be described. In the configuration, the phase difference is determined based on an interval between successive zero passages of a signal pair.

FIG. 5 is a schematic representation of phase measurement devices for the first and second signal processing path, which may be used as phase measurement devices 54 and 59 in the evaluation device 51.

The phase measurement device for the first signal processing path comprises a first counter 82. The phase measurement device for the second signal processing path comprises a second counter 84. A square-shaped reference signal 92 is supplied to a start input of the first counter 82 and a start input of the second counter 84. A first square-shaped signal 93 is supplied to the stop input of the first counter 82. A second square-shaped signal 94 is supplied to the stop input of the second counter 84. The first and second counters 82, 84 may be configured such that a positive signal edge of the square-shaped reference signal 92 at their start input starts a counting process, and that a positive signal edge of the first or second square-shaped signals 93 and 94, respectively, at their stop input stops the counting process. To this end, a flip-flop may be set with the positive edge of the square-shaped reference signal 92, while the flip-flop is reset with the positive edge of the first and second square-shaped signals 93 and 94, respectively. A gate circuit is thereby realized which transmits a pulse signal which is present at the count input of the respective counter 82 and 84, respectively, to a counting circuit in the time between positive edges of the square-shaped reference signal 92 and of the first and second square-shaped signals 93 and 94, respectively. The count inputs of the counters 82 and 84 are connected to a clock signal generator 86 which provides a clock signal to the count in-puts. A counter value of the first counter 82 may be read out over an interface 83, e.g. a 16 Bit USB port. A counter value of the second counter 84 may be read out over an interface 85, e.g. a 16 Bit USB port. For the readout process, a USB connection 87 may be provided which can be coupled to a computer.

FIG. 6 illustrates the various signals at the counter 82. The square-shaped reference signal 92, the rising edge of which starts the counter, and the first square-shaped signal 93, the rising edge of which stops the counter, define a time window represented by the signal 102. In the time window, the transmission of the pulses generated by the clock signal generator 86 to the counting circuit is allowed such that the counter value is increased in the time window between the rising edges in accordance with the number of pulses, as schematically shown with signal 103.

In an implementation, the square-shaped reference signal 92 may be generated from the first oscillating reference signal 72, the first square-shaped signal 93 may be generated from the component 73 of the measured signal which oscillates with the first frequency, and the second square-shaped signal 94 may be generated from the down-converted second component 78 of the measured signal. To this end, the phase measurement devices may comprise, for each one of these signals, a comparator, the output of which switches between the two states "zero" and "one" at a zero passage of the oscillating signal to generate the square-shaped signals 92-94. The interval between the positive edge of the square-shaped reference signal 92 and the positive edge of the first square-shaped signal 93 corresponds to the interval between zero passages of the signals 72 and 73, from which the phase difference between these signals can be determined.

In an implementation, the first oscillating reference signal 72, the first component 73 of the measured signal which oscillates with the first frequency, and the down-converted second component 78 of the measured signal may be down-converted further before they are supplied to the phase measurement device. For example, the signals may be down-converted to a frequency range having frequencies which are smaller than the repetition rate. For this purpose, a mixer may respectively be provided for the first oscillating reference signal 72, the component 73 of the measured signal which oscillates with the first frequency, and the down-converted second component 78 of the measured signal, wherein each of the mixers is supplied with the same oscillating signal, e.g. from an external oscillator. Band pass filters may be provided to suppress components of the output signals of the mixers which oscillate with the sum frequency. Such a down-conversion may in particular be performed using the methods and devices which are described in the German patent application DE 10 2009 024 460.3, "Auswerteeinrichtung, Messanordnung and Verfahren zur Weglängenmessung" (Evaluation device, measuring arrangement and methods for path length measurement) of the applicant, which was filed on the same day.

The frequency to which the first oscillating reference signal 72, the first component 73 of the measured signal which oscillates with the first frequency and the down-converted second component 78 of the measured signal are down-converted further may be selected with regard to a desired measurement accuracy and a desired measurement rate. E.g., in the implementation of the phase measurement device shown in FIG. 5, the phase resolution increases with decreasing frequency for a given time resolution. The number of phase values which can be resolved is given by the quotient of the frequency of the signals which are supplied to the phase measurement device and the count frequency of the count signal generator 86, so that the phase resolution becomes smaller with smaller frequency of the signals. The maximum measurement rate which can theoretically be attained is given by the frequency of the signals which are supplied to the phase measurement device. If the counter values are not read out after each measurement cycle, but if, for example, counter values are averaged over a certain number of periods, e.g. ten periods, of the signals which are supplied to the phase measurement device, the measurement rate is correspondingly decreased further.

Exemplary parameters for the operation of the phase measurement device of FIG. 5 may be selected such that the first oscillating reference signals 72, the first component 73 of the measured signal which oscillates with the first frequency, and the down-converted second component 78 of the measured signal are down-converted further until they oscillate with a frequency of approximately 10 kHz. In this case, the down-conversion is performed such that the phase differences between the signals are preserved. The count signal generator 86 may for example provide count signals with a count frequency of 100 MHz. The phase may then be measured with a resolution of $2\cdot\pi\cdot 10$ kHz/100 MHz, i.e. in ten thousand steps.

Other phase measurement devices may be used in evaluation devices according to other embodiments. For example, the first and second oscillating signal may be sampled, with a fit being subsequently made to the sampled values to determine the phase difference. It is also possible that a conventional phase meter is used.

Figure 7:
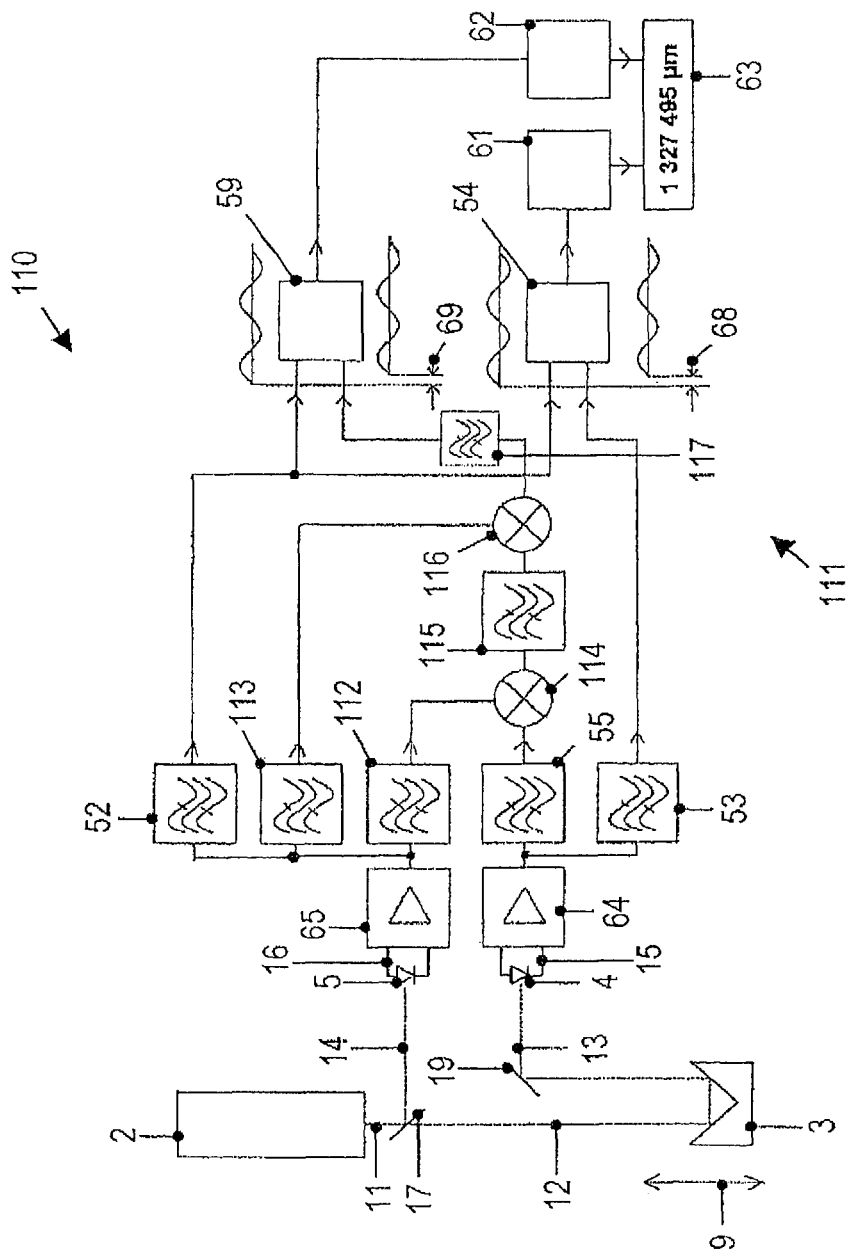
FIG. 7 is a schematic representation of a measuring arrangement according to another embodiment.

FIG. 7 is a schematic representation of a measuring arrangement 110 according to another embodiment. The measuring arrangement 110 comprises a light source 2, a reflector 3' to be mounted on an object, a beam splitter 17 and a deflecting mirror 19 for directing a reference beam 14 and measurement beam 12, 13, a photodetector 4 for capturing an intensity of the measurement beam 12, 13 as a function of time and another photodetector 5 for capturing an intensity of the reference beam 14 as a function of time. Elements and devices of the measuring arrangement 110 which correspond, with regard to their function and construction, to corresponding elements and devices of the measuring arrangement 1 of FIG. 1 and of the measuring arrangement 50 of FIG. 4 are designated with the same or similar reference numerals, so that additional reference is made to the description of the measuring arrangement 1 and of the measuring arrangement 50.

The measuring arrangement 110 comprises an evaluation device 111 for evaluating the measured signal captured by the photodetector 4. The evaluation device 111 has an amplifier 64 which is coupled to the photodetector 4 to amplify the measured signal 15 supplied by the photodetector 4. The evaluation device 111 has an amplifier 65 which is coupled to the other photodetector 5 to amplify the reference signal 16 provided by the other photodetector 5.

The evaluation device 111 has a first signal processing path for the first component of the measured signal 15, which first component oscillates with a first frequency $f_p = p\cdot f0$, where $p \geq 1$ is an integer number. The first signal processing path comprises a band pass filter 53 and a phase measurement device 54 and is configured in the same way as the first signal processing path of the evaluation device 51. The phase measurement device 54 determines a phase difference between the first component of the measured signal and a component of the reference signal which oscillates with the same frequency $f_p$, and which is supplied by a band pass filter 52 coupled to the amplifier 65.

The evaluation device 111 has a second signal processing path for the second component of the measured signal 15, which second component oscillates with a second frequency $f_n = n\cdot f0$, where n is an integer number and n>p. The second signal processing path comprises a band pass filter 55 which is configured in the same way as the band pass filter 55 of the evaluation device 51. The second signal processing path comprises two mixers 114, 116 and two band pass filter 115, 117. In the second signal processing path, the second component of the measured signal 15 is down-converted in two stages, similarly to a double super heterodyne receiver.

The evaluation device 111 comprises band pass filters 112, 113 which are coupled, at an input side, to the amplifier 65 to receive the amplified reference signal. The band pass filter 112 has a pass band which comprises a frequency $f_{n-r} = (n-r)\cdot f0$. Here, r is an integer number and n>r>p. The band pass filter 113 has a pass band which comprises a frequency $f_{r-p} = (r-p)\cdot f0$. The band pass filters 112, 113 may respectively have a pass band having a width which is less than f0.

An output signal of the band pass filter 55 which corresponds to the second component of the measured signal, and an output signal of the band pass filter 112 are supplied to the mixer 114. An output of the mixer 114 is coupled to a band pass filter 115. The band pass filter 115 is configured such that it strongly attenuates the component of the output signal of the mixer 114 which oscillates with the sum frequency $f_n + f_{n-r}$ compared to the component of the output signal of the mixer 114 which oscillates with the difference frequency $f_n - f_{n-r}$. The output signal of the band pass filter 115 lies in an intermediate frequency range at the frequency $f_r$.

The output signal of the band pass filter 115 and an output signal of the band pass filter 113 are supplied to the mixer 116. An output of the mixer 116 is coupled to a band pass filter 117. The band pass filter 117 is configured such that it strongly attenuates the component of the output signal of the mixer 116 which oscillates with a sum frequency $f_r + f_{r-p}$ compared to the component of the output signal of the mixer 116 which oscillates with the difference frequency $f_r - f_{r-p}$. The output signal of the band pass filter 117 thus oscillates with the frequency $f_p$. The output signal of the band pass filter 117 is supplied to the phase measurement device 59 where it is evaluated, as described for the evaluation device 51.

The operation of the phase measurement devices 54, 59 and of the evaluation logic 61-63 of the evaluation device 111 corresponds to that of the corresponding components of the evaluation device 51.

Exemplary parameters for a configuration of the measuring arrangement are as follows. The light source 2 may generate light pulses with a repetition rate f0=100 MHz. The evaluation device 111 may be configured such that it evaluates the first component of the measured signal which oscillates with $f_1 = f0$ (p=1) and the second component of the measured signal which oscillates with $f_{240} = 240\cdot f0$ (n=240). The second component may be down-converted via an intermediate frequency range having the frequency $f_{60}=60 \cdot f0$ (r=60). Correspondingly, the band pass filters 52 and 53 may have a pass band at the frequency 100 MHz, the band pass filter 55 may have a pass band at the frequency 24 GHz, the band pass filter 112 may have a pass band at the frequency 18 GHz, and the band pass filter 113 may have a pass band at the frequency 5.9 GHz.

The evaluation devices 51, 111 may also be configured such that the estimation device 61 evaluates both the phase angle of the first component of the measured signal, which phase angle is determined by the phase measurement device 54, and the phase angle of the second component of the measured signal, which phase angle is determined by the phase measurement device 59, to obtain the first estimate for the path length to be measured, as already explained in connection with an example. For this purpose, the quantity q which represents the count of full wavelengths $\lambda_n$ in the path length to be measured, d, may for example first be determined according to Equation (7) and may be subjected to a consistency check based on the phase angle of the second component of the measured signal.

Figure 8:
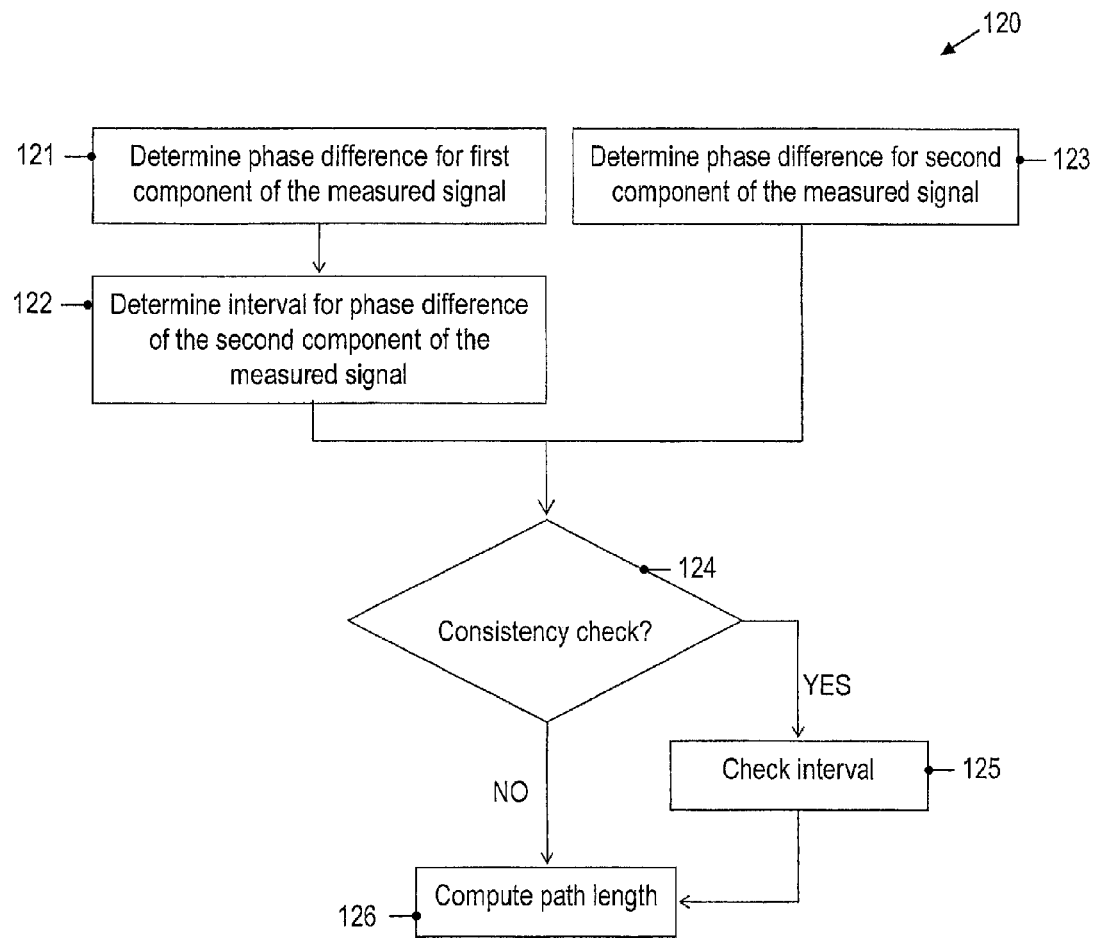
FIG. 8 is a flow chart representation of a method which is performed by an evaluation device according to an embodiment.

FIG. 8 is a schematic flow chart representation of a method 120 which is performed by the evaluation device according to an embodiment.

At 121, a first phase difference associated with the first component of the measured signal is determined. At 122, the count q of full wavelengths $\lambda_n$ of the second component of the measured signal in the path length to be measured is determined, based on the first phase difference associated with the first component of the measured signal. For this purpose, q may, for example, be determined according to Equation (7) in step 122. The count q determines the interval from $q \cdot \lambda_n$, to $(q+1) \cdot \lambda_n$, in which the path length measurement is refined based on the evaluation of the higher frequency, second component of the measured signal. At 123, a second phase difference associated with the second component of the measured signal is determined in its uniqueness range. Determining the phase differences 121, 123 may be performed using the first and second signal processing paths of the evaluation device 51 or of the evaluation device 111.

At 124, it is determined whether a consistency check is to be performed for the interval determined at 122. Such a consistency check may, for example, be performed when the quantity $d_p = \lambda_p \cdot |\Delta\phi_p|/(2\cdot\pi)$ determined according to Equation (6) is approximately equal to an integer multiple of $\lambda_n$. For this purpose, it may be verified whether the distance of $d_p$ from the adjacent multiples of $\lambda_n$, $(d_p - q \cdot \lambda_n)$ or $((q+1) \cdot \lambda_n - d_p)$, is less than a threshold value. The threshold value may be selected as a function of the resolution for determining the first phase difference and as a function of the ratio of the first frequency $f_p$ and the second frequency $f_n$. If no consistency check is to be performed, the path length is determined at 126, according to Equation (9), for example. If it is determined at 124 that a consistency check is to be performed, at 125 the interval determined at 122 is verified and adapted if required. The verification of the interval at 125 may include an adaption of the count q of full wavelengths $\lambda_n$ of the second component of the measured signal in the path length to be measured, which count was determined at 122.

Figure 9:
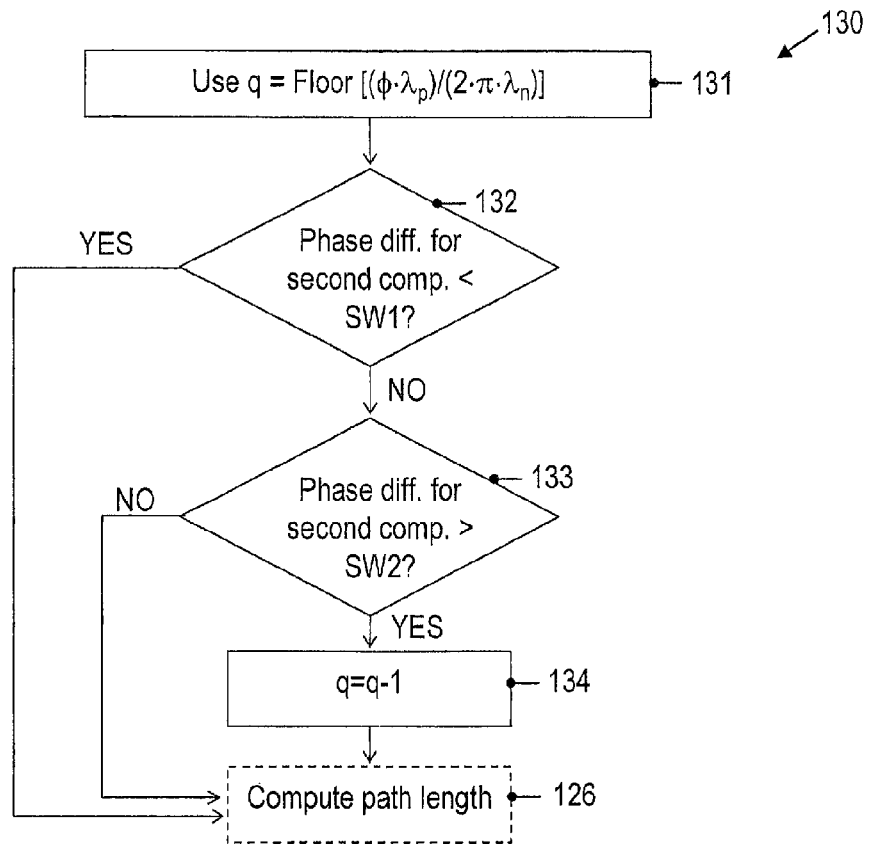
FIG. 9 is a flow chart representation of a consistency check which may be used in the method of FIG. 8.

FIG. 9 is a flow chart representation of a procedure 130 which may be used to check the determined interval. The procedure 130 may be used to implement the verification at 125 in the method 120 of FIG. 8.

At 131, q is determined according to Equation (7). At 132, it is verified whether the measured second phase difference $|\Delta\phi'_n|$ for the second component of the measured signal is less than a first threshold value, SW1. If the measured second phase difference $|\Delta\phi'_n|$ for the second component of the measured signal is less than the first threshold value SW1, the verification of the interval is terminated without a correction being made to the determined quantity q. If the measured phase difference $|\Delta\phi'_n|$ for the second component of the measured signal is not less than the first threshold value SW1, at 133 it is verified whether the measured second phase difference $|\Delta\phi'_n|$ for the second component of the measured signal is greater than a second threshold value, SW2. If the measured second phase difference $|\Delta\phi'_n|$ for the second component of the measured signal is not greater than the second threshold value SW2, the verification of the interval is terminated without a correction being made to the determined quantity q. If the measured second phase difference $|\Delta\phi'_n|$ for the second component of the measured signal is greater than the second threshold value SW2, at 134 the quantity q determined according to Equation (7) is decremented by 1. The path length is then computed using this new value for q.

Using the procedure 130 it is possible to verify whether the value of q determined in accordance with Equation (7) is also consistent with the measured second phase difference $|\Delta\phi'_n|$ for the second component of the measured signal. For example, an inconsistency may be detected if the quantity $d_p = \lambda_p \cdot |\Delta\phi_p|/(2\cdot\pi)$ determined in accordance with Equation (6) is only slightly greater than an integer multiple of $\lambda_n$, and the measured second phase difference $|\Delta\phi'_n|$ for the second component of the measured signal has a value which is only slightly less than $2\cdot\pi$. In this case, q may be corrected accordingly before the path length is determined.

The threshold values SW1 and SW2 in the procedure 130 may be selected based on the resolution for determining the first phase difference and based on the ratio of the first frequency $f_p$ and the second frequency $f_n$. The second threshold value SW2 may be selected such that it is slightly less than $2\cdot\pi$.

Figure 10:
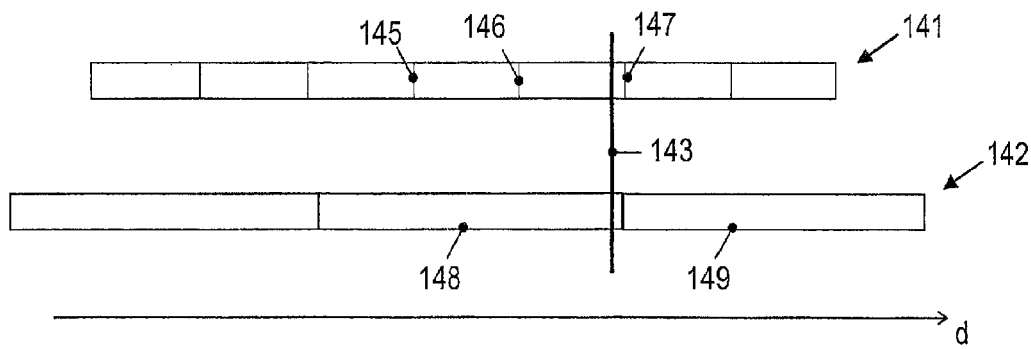
FIG. 10 illustrates a path length determination for explaining the methods of FIGS. 8 and 9.

FIG. 10 illustrates the verification of the interval according to the procedure 130. FIG. 10 shows distance values 145-147, which may be determined owing to a finite phase resolution in the measurement of the first phase difference. Intervals 148, 149 are shown at 142, the length of the intervals corresponding to the wavelength $\lambda_n$ of the second component of the measured signal.

If the path length to be measured has the value shown at 143, it lies within the interval 148. If the measurement of the first phase difference according to Equation (6) yields a value which, for example, corresponds to the value shown at 146, the correct value q and, thus, the correct interval 148 for refining the path length measurement are determined. It is not required that q be corrected. If the measurement of the first phase difference according to Equation (6) yields a value which, for example, corresponds to the value shown at 147, the verification of the interval is initiated because the distance value 147 is only slightly greater than the lower limit of the interval 149. As the second phase difference $|\Delta\phi'_n|$ measured for the second component of the measured signal has a value which is only slightly less than $2\cdot\pi$, an inconsistency between the interval 149, which would be associated with the first phase difference according to Equation (7), and the measured second phase difference $|\Delta\phi'_n|$ is detected, and the interval is corrected accordingly by decrementing the value for q by one.

The measuring arrangements which were explained with reference to FIG. 1-10 are exemplary fields of application for the evaluation device and the method for path length measurement according to various embodiments. Various modifications may be made in measuring arrangements according to other embodiments.

While the sequence of light pulses travels freely in the measuring arrangements 1, 50 and 110 explained with reference to FIG. 1-10, for example, the light may also be partially guided in a light guide, in particular an optical fiber made from glass or plastic, for example, in measuring arrangements according to other embodiments. The measuring arrangement may comprise an optical fiber, for example, having an end which is attached to the object, the distance of which is to be determined from a reference position. In an embodiment, the other end of the optical fiber may be provided in proximity to the detector 4.

The light source may in particular also comprise a laser which generates light in the non-visible spectrum, such as the infrared spectral range.

While two signal processing paths are provided for processing a first and a second component of the measured signal in the evaluation devices explained in detail with reference to FIG. 1-10, the evaluation device may comprise an additional signal processing path or plural additional signal processing paths for processing another component or plural other components of the measured signal, which respectively oscillate with a frequency that is different from the first and second frequencies. The evaluation device may, for example, be configured to evaluate a third component of the measured signal which oscillates with a third frequency that corresponds to an integer multiple of the repetition rate and which is greater than the second frequency. The evaluation device may be configured to evaluate a phase angle of the third component.

While the other detector 5 is provided in the measuring arrangements 1, 50 and 110 explained with reference to FIG. 1-10 to capture the light intensity at a reference position as a function of time, a corresponding reference signal may also be provided in other ways. In an embodiment, the optical frequency comb generator may for example have an output to output an electrical signal which represents the light intensity emitted by the laser 2 as a function of time. This output of the laser 2 can be coupled to the evaluation device 6, 51 or 111 which uses the signal provided by the laser 2 as a reference signal, or for generation of the reference signal for a phase measurement.

The light source may also be configured as a short pulse laser, having a pulse duration in the picosecond range, for example, which is operated triggered by an external generator. Advantageously, this generator has a high frequency stability. For example, commercial generators and quartz oscillators, respectively, can attain a stability of $10^{-6}$. When the signals are coupled to a frequency standard (such as DCF 77) the stability may be increased even further.

In an embodiment, the repetition rate of the sequence of light pulses may be adjustable. Thereby, a very long distance may be realized as uniqueness range if a low repetition rate is selected first. When the repetition rate is 10 MHz, a wavelength of 30 m with the same uniqueness range for the path length measurement results. By switching the repetition rate over to a correspondingly higher frequency such that, during the switching over there is no change in the path length to be measured, another measurement having a finer resolution may subsequently be performed.

Instead of a reflector which is to be mounted to the object, it is also possible that the surface of the object itself reflects or scatters light so that, in other embodiments, a separate reflector at the object is not needed.

While in the measuring arrangements 1, 50 and 110 a distance measurement in one dimension is schematically shown, it is also possible that plural detectors 4 and/or plural reflectors 3 to be mounted to the object are used to determine the distance of a reflector from various reference positions, or to determine the distance of various reflectors from a reference position, as described in DE 10 2008 045 387, for example. The coordinates of the reflector may then be determined in two or three dimensions, using trilateration for example.

A field of application for such a position determination in a space is the determination of the position of a measuring head of a coordinate measuring device, which will be described in more detail with reference to FIG. 11-21.

Another aspect of the invention relates to a measuring arrangement and a method for a coordinate measuring device which allows the position of the measuring head of a coordinate measuring device to be determined using optical measuring techniques.

Figure 11:
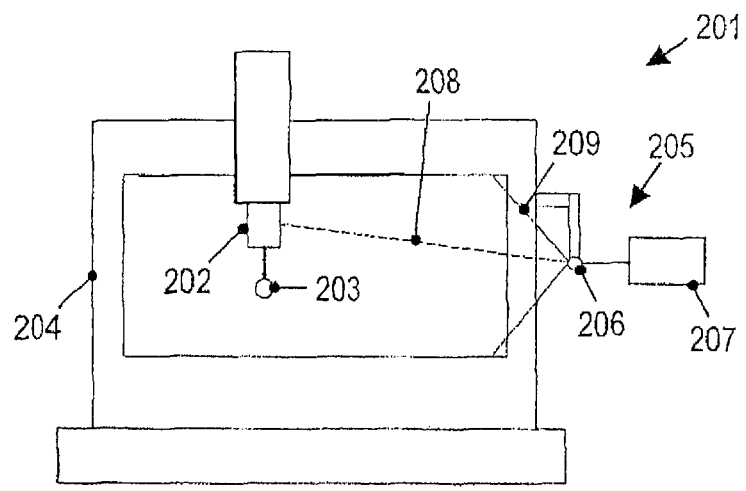
FIG. 11 is a schematic representation of a coordinate measuring device according to an embodiment.

FIG. 11 is a schematic representation of a coordinate measuring device 201 according to an embodiment. The coordinate measuring device 201 is formed as a bridge-type measuring machine and comprises a measuring head 202 which carries a stylus 203. The measuring head 202 is movably supported on a frame 204 of the coordinate measuring device 201 and may be displaced such that the stylus 203 can be brought into contact with an object, the surface of which is to be measured using the coordinate measuring device 201.

The coordinate measuring device 201 comprises a measuring arrangement for optically determining the position of the measuring head 202. The measuring arrangement comprises at least one system 205 for path length measurement (which is only schematically shown in FIG. 11) having optical components, which are schematically shown at 206 and which may comprise a light source and a photodetector, for example. The light source is configured to generate a sequence of light pulses with a repetition rate. The system has a suitable expansion optics to irradiate the sequence of light pulses into a conical spatial region 209 in which a distance of the measuring head 202 from the system 205 is to be determined. The photodetector of the system 205 captures an intensity of the sequence of light pulses after they have travelled through a path 208 between the system and the measuring head 202 at least once. The photodetector of the system 205 for path length measurement may receive the sequence of light pulses via a beam splitter and/or a focusing lens, for example. A reflector may be provided on the measuring head 202, which may for example be configured as a retroreflector which reflects the light beam irradiated onto the measuring head 202 by the system 205 parallel to the incident light beam, so that the path between the system 205 and the measuring head 202 is covered twice by the sequence of light pulses. An evaluation device 207 is coupled to the photodetector of the system 205 and is configured to evaluate a phase angle of a component of the measured signal captured by the photodetector to determine the path length covered by the sequence of light pulses.

Because the system 205 for path length measurement and the measuring head 202 have finite extensions, the terms "path length" and "distance", respectively, between the system for path length measurement and the measuring head are to be understood, here and hereinafter, in the sense that they designate the path length and distance, respectively, covered by the sequence of light pulses between a reference position of the system, such as the point of incidence of a light beam generated by the light source at a beam splitter or deflecting mirror or the output opening of a laser, and a certain region on the measuring head having limited extensions, such as a reflector at the measuring head 202.

In the coordinate measuring device 201, the system 205 for path length measurement may comprise an arrangement as explained with reference to FIG. 1-10, with a suitable expansion optics being provided to irradiate the sequence of light pulses into the measurement region, for example in a conical shape.

In order to determine three coordinates which specify the position of the measuring head 202 in space, the measuring arrangement for the coordinate measuring device may be configured to determine the path lengths of three paths, which are not all located in one plane. If the orientation of the measuring head 202 in space is invariable, as is the case when the measuring head 202 is linearly displaced in three orthogonal directions, for example, the three coordinates of the measuring head 202 may be determined from the three path lengths, with the three coordinates specifying the position of the measuring head. If the orientation of the measuring head 202, i.e. the angular position of the measuring head 202 in space, is also variable, additional path length measurements may be provided accordingly to determine both the position and the orientation of the measuring head 202. If the coordinate measuring device provides a smaller number of degrees of freedom for the measuring head 202, for example if it is configured as a planar measuring device in which the measuring head 202 is only displaced in a plane, a correspondingly smaller number of the systems for path length measurement is sufficient which determine the lengths of two paths which are not parallel to each other. The optical components of the measuring arrangement may be located at fixed positions relative to the frame 204 of the coordinate measuring device 201, such that the position of the measuring head may be determined relative to the frame 204 of the coordinate measuring device 201.

In the coordinate measuring device 201 and in the measuring arrangements and measuring devices which will be explained with reference to FIG. 12-21, the operation may be such that the measuring head and thus the stylus is advanced to an object which is to be measured in a sensing manner. Upon contact between the stylus and the object, a trigger signal is output. The trigger signal may be supplied to the measuring arrangement for determining the position of the measuring head. In response to the trigger signal, the currently determined coordinates of the measuring head are stored. If the stylus 203 is movably supported on the measuring head 202, the deflection of the stylus 203 is simultaneously detected and stored, so that it can be offset against the coordinates determined by the optical measuring arrangement.

In the coordinate measuring device 201 and in the measuring arrangements and measuring devices which will be described with reference to FIG. 12-21, a measuring head having an optical sensing device, such as a distance sensing device, may be used instead of a mechanical stylus. A possible configuration of such an optical sensing device is a triangulation sensing device which is provided at a lower end of the measuring head. The optical sensing device may also be configured to output a trigger signal, in response to which the currently determined coordinates of the measuring head are stored.

Figure 12:
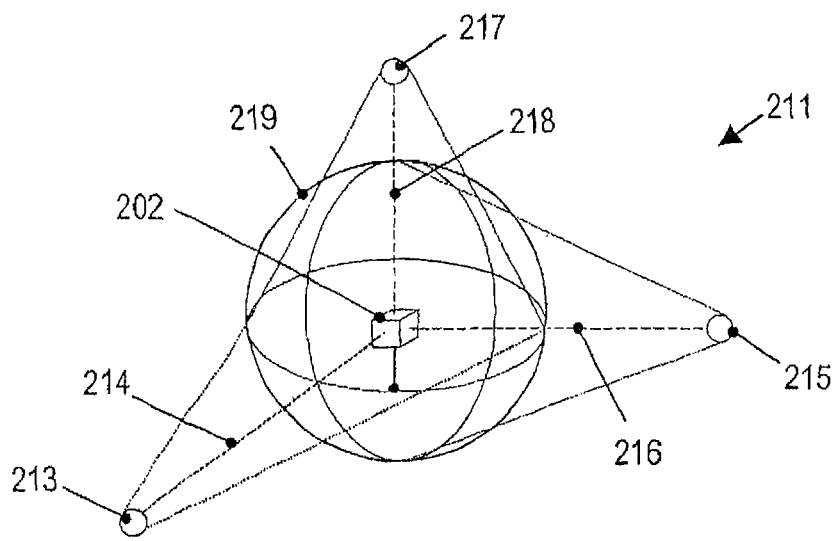
FIG. 12 is a schematic representation of a measuring arrangement for a coordinate measuring device according to an embodiment.

FIG. 12 schematically shows a measuring arrangement 211 having three systems 213, 215, 217 for path length measurement. The system 213 is configured to determine a path length of a path 214 between the system 213 and a reflector which is provided at a side of the measuring head 202 facing toward the system 213. The system 215 is configured to determine a path length of a path 216 between the system 215 and a reflector which is provided at a side of the measuring head 202 which faces toward the system 215. The system 217 is configured to determine a path length of a path 218 between the system 217 and a reflector that is provided at a side of the measuring head 202 which faces toward the system 217. The distances between the reflectors provided at the measuring head and the corresponding systems 213, 215, 217 may be determined from the three path lengths of the paths 214, 216, 218. As the position of the optical components of the systems 213, 215, 217 relative to each other and therefore the reference positions of the systems 213, 215, 217, relative to which the path lengths 214, 216, 218 are measured, are known, the position of the measuring head may be determined from the relative positions of the optical components of the systems 213, 215, 217 and the path lengths of the paths 214, 216, 218, using trilateration, for example.

The systems 213, 215, 217 may be formed respectively independently and separately from each other. For example, each one of the systems 213, 215, 217 may comprise a measuring arrangement having an evaluation device, as described with reference to FIG. 1-10. The systems 213, 215, 217 for path length measurement may also share optical or electrical components. For example, only one light source may be provided for generating the sequence of light pulses, light being irradiated onto the measuring head 202 from different directions using suitably configured beam splitters and deflection mirrors.

If only three systems for path length measurement are provided, the measurement volume in which the position of the measuring head 202 can be determined is given by the intersection of the spatial regions in which each one of the systems 213, 215, 217 for path length measurement can perform a path length measurement. These spatial regions may be defined by the intersection of the light cones of the systems 213, 215, 217, for example. If more than three systems for path length measurement are provided, the measurement volume in which the position of the measuring head 202 can be determined is given by the union of the spatial regions in which respectively at least three systems for path length measurement can perform a path length measurement. Using more than three systems for path length measurement may thus allow a position of the measuring head 202 to be determined also in spatial regions in which the measuring head is shadowed from one of the systems.

Figure 13:
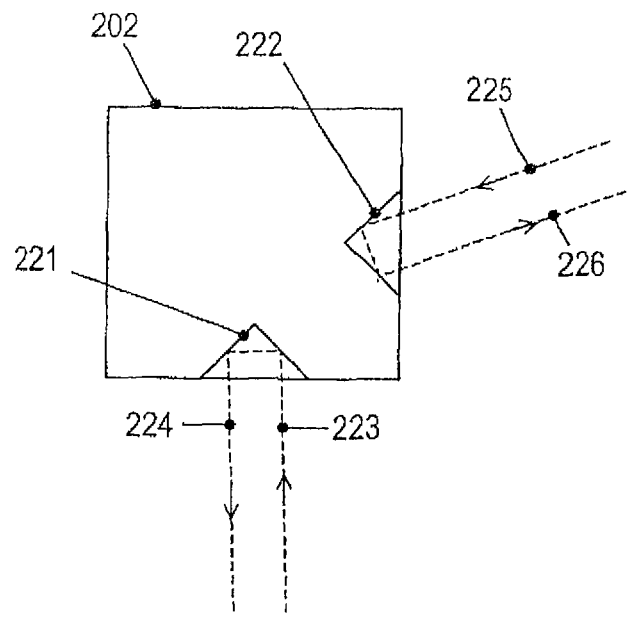
FIG. 13 is a schematic representation of a measuring head of a coordinate measuring device according to an embodiment.

FIG. 13 is a schematic plan view of a measuring head 202. The measuring head 202 may be used in the coordinate measuring device 201 of FIG. 11 and in combination with the measuring arrangement 211 of FIG. 12.

The measuring head 202 is configured such that it has three retroreflection planes which are respectively disposed at right angles relative to each other. For this purpose, side faces of the measuring head 202 which are orthogonal to each other may respectively be provided with a retroreflector 221 and 222, respectively. Another retroreflector is formed at a side face of the measuring head which is orthogonal to the drawing plane of FIG. 13. The retroreflector 221 is formed such that it reflects back an incident light beam 223 into a light beam 224 in a parallel manner. The retroreflector 222 is formed such that it reflects back an incident light beam 225 into a light beam 226 in a parallel manner.

In an embodiment, the measuring head 202 may be provided on the coordinate measuring device 201 such that the measuring head 202 is linearly movable along directions which are orthogonal to the side faces of the measuring head which are formed with retroreflectors. The measuring head 202 may accordingly be used in a coordinate measuring device 201 which provides a conventional linear kinematics along three orthogonal axes for the measuring head 202.

A retroreflector provided on the measuring head, or plural retroreflectors provided on the measuring head, respectively, may be electrically switchable, i.e. they may have reflection characteristics which are controllable with an electrical signal. As will be explained in more detail with reference to FIG. 16, such reflectors allow the reflected light to be modulated, or allow distances between different regions of the measuring head and a reference position to be determined in a time-sequential manner.

Figure 14:
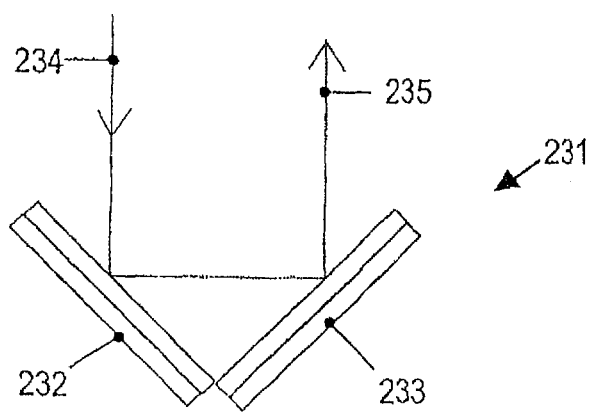
FIG. 14 illustrates a configuration of a reflector which may be used in the measuring arrangement of FIG. 13, FIG. 15 or FIG. 16.

FIG. 14 shows a reflector 231 which has electrically switchable reflection characteristics. The reflector 231 may be provided on the measuring head 202. The reflector 231 comprises plural LCOS (liquid crystal on silicon)-elements 232, 233 which are arranged in the form of a triple mirror or a corner cube, for example. LCOS elements having nematic liquid crystals or LCOS elements having ferroelectric liquid crystals may be used. Ferroelectric LCOS elements may be used to attain high measurement rates in position determination. The LCOS elements 232, 233 are electrically controllable reflectors, the reflection coefficient of which may be controlled with an applied voltage. Using a reflector 231 having such a configuration, an intensity of a reflected light beam 235 may be adjusted when a light beam 234 is incident upon the reflector 231. The reflector 231 allows the intensity of the reflected light beam 235 to be modulated in time, for example, or allows a selective adjustment whether a retroreflector is visible for a system for path length measurement or not.

With reference to FIG. 15-21, coordinate measuring devices and measuring arrangements therefor according to various embodiments will be described, in which different beam paths are realized for measuring plural distances between regions of the measuring head and reference positions. In each one of the coordinate measuring devices, the measuring arrangement comprises a system for a path length measurement or plural systems for a path length measurement. While occasionally not shown in detail in FIGS. 15-21, the systems for path length measurement comprise a light source for generating a sequence of light pulses, a photodetector for capturing an intensity of the sequence of light pulses after the sequence has covered a path length between the system for path length measurement and the measuring head, and an evaluation device for evaluating a measured signal provided by the photodetector. The evaluation device is respectively configured to determine a phase angle of a component of the measured signal which oscillates with the repetition rate or a multiple of the repetition rate, in order to determine the covered path length. Each one of the systems for path length measurement may for example comprise a measuring arrangement as described with reference to FIG. 1-11.

Figure 15:
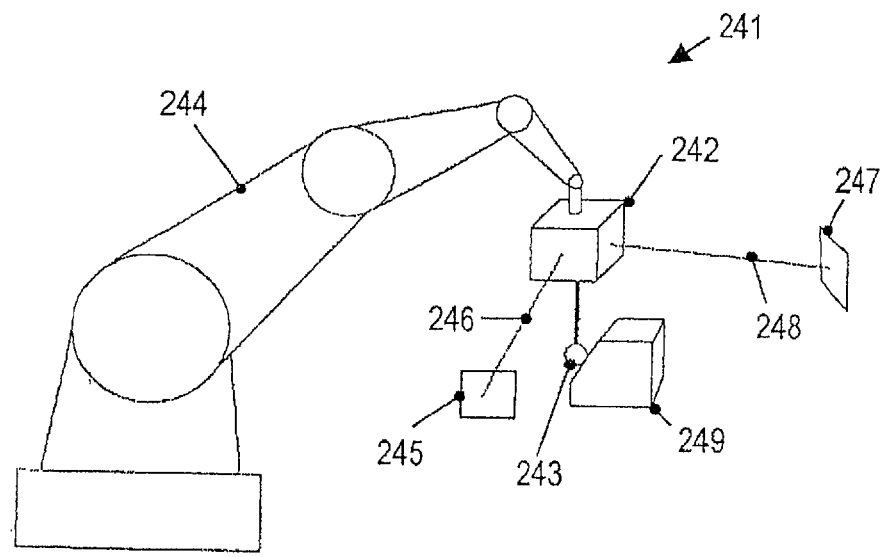
FIG. 15 is a schematic representation of a coordinate measuring device according to another embodiment.

FIG. 15 is a schematic representation of a coordinate measuring device 241 according to an embodiment. The coordinate measuring device 241 comprises a robot arm 244. A measuring head 242 is provided at an end of the robot arm 244. A stylus 243 is arranged at the measuring head. The robot arm 244 is provided to move the measuring head 242, for example in order to scan a surface of an object 249. The robot control may be configured such that the measuring head 242 is moved along three axes which are orthogonal relative to each other in a translatory fashion, but is not rotated.

A retroreflector is respectively formed on three side faces on the housing of the measuring head 242 which are orthogonal relative to each other, as explained with reference to FIG. 13.

A system 245 for path length measurement which is schematically shown determines a path length covered by a sequence of light pulses along a path 246 between a reference position of the system 245 and the retroreflector which is provided at the side of the measuring head 242 that faces toward the system 245. Another system 247 for path length measurement, which is schematically shown, determines a path length covered by a sequence of light pulses along another path 248 between a reference position of the other system 247 and the retroreflector that is provided at the side of the measuring head 242 that faces toward the other system 247. A third system for path length measurement (not shown) determines the length of a third path between a third reference position and the measuring head. The position of the measuring head 242 may be determined from the three path lengths and the known positions of the optical elements of the systems for path length measurement, using a computer, for example.

A sensor provided on the measuring head 242 outputs a trigger signal when the stylus 243 contacts the object 249. In response to the trigger signal, the measuring arrangement with the systems 245, 247 determines the position of the measuring head 242. It is also possible that the position is determined quasi-continuously at a measurement rate which may lie in the range of several kHz, wherein the current position is detected and stored when the trigger signal is output.

Figure 16:
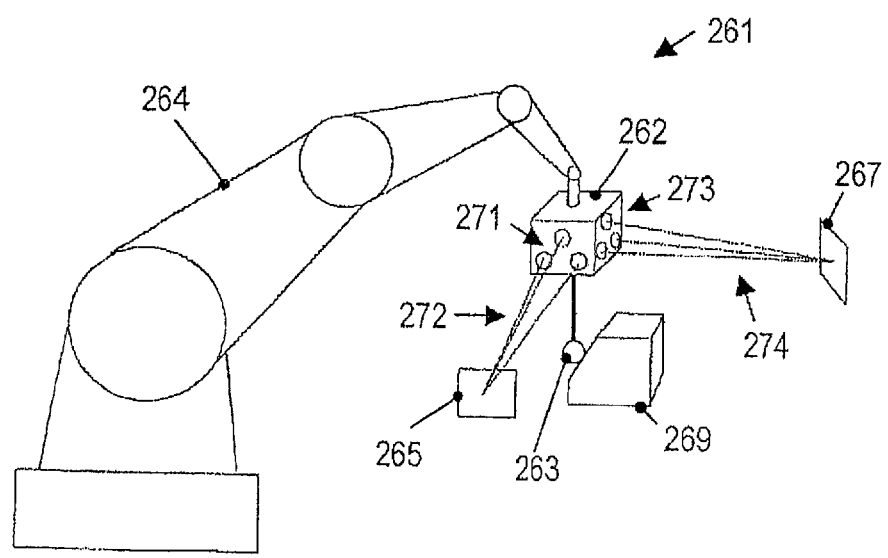
FIG. 16 is a schematic representation of a coordinate measuring device according to another embodiment.

FIG. 16 is a schematic representation of a coordinate measuring device 261 according to an embodiment. The coordinate measuring device 261 comprises a robot arm 264. A measuring head 262 is provided at an end of the robot arm 264. A stylus 263 is arranged at the measuring head. The robot arm 264 is provided to move the measuring head 262, for example in order to scan a surface of an object 269. The robot control may be configured such that the measuring head 262 is moved along three axes which are orthogonal relative to each other, but is not rotated.

Three retroreflectors 271 which are spaced from each other are provided on a first side face on a housing on a measuring head. Each one of the retroreflectors may be formed as a triple mirror or a corner cube, as explained with reference to FIG. 13.

A system 265 for path length measurement which is schematically shown determines a path length for three different paths 272 which are covered by a sequence of light pulses between a reference position of the system 265 and respectively one of the three retroreflectors 271, which is provided on the side of the measuring head 262 that faces toward the system 265. The position of the measuring head 262 may be determined from the three determined path lengths and the known relative positions of the three retroreflectors 271 to each other.

In order to allow each one of the three determined path lengths to be assigned to respectively one of the three retroreflectors 271, the three retroreflectors 271 are coded such that they can be distinguished by the system 265. The coding may be attained, for example, in that the retroreflectors 271 are exposed in a time-sequential manner using mechanical or electrical shutters, such that respectively only one of the three retroreflectors 271 is reflecting at any given time. Retroreflectors having electrically switchable reflection characteristics may also be used instead of shutters for performing such a time-sequential measurement, as explained with reference to FIG. 14. The measured path lengths and distances, respectively, may then be assigned to the retroreflector which is respectively exposed.

In an embodiment, the system 265 may have laser light sources having three different wavelengths of the output light. Each one of the retroreflectors 271 may be designed selectively for only one of the wavelengths, for example by using a suitable color filter. The measured path lengths may then be assigned to one of the three retroreflectors 271, depending on the wavelength of the light. The system 265 may comprise plural photodetectors which are also provided with corresponding color filters to selectively capture light having one wavelength. The wavelengths may be suitably selected such that they can be discriminated well. In an implementation, light of the first and second wavelength of an internally frequency-doubled laser is used, as well as another laser having a wavelength which lies approximately in the center between the wavelengths of the frequency-doubled laser mentioned above. In this manner, a sufficient distance may be attained between the various wavelengths, and the selection of the filters may be simplified.

In another embodiment, the light reflected by the retroreflectors 271 is modulated. The modulation may be performed such that, for example, the light reflected by different retroreflectors is amplitude-modulated at different frequencies. For example, the reflection characteristics of a first reflector may be modulated with 2 kHz, the reflection characteristics of a second reflector may be modulated with 5 kHz, and the reflection characteristics of the third reflector may be modulated with 7 kHz. For this purpose, corresponding modulators may be provided in front of the reflectors 271, for example, which modulators are operated with the corresponding modulation frequency to impress an amplitude modulation onto the reflected light. In the evaluation device, a filtering is performed for each used amplitude modulation frequency to assign the received signals to the different reflectors 271. Alternatively, the retroreflectors themselves may have electrically adjustable reflection characteristics which are varied with different frequencies to attain a modulation of the reflected light intensity. For each one of the signals which have been assigned by filtering, a phase angle or a run-time delay may subsequently be determined. As the modulation frequencies are small compared to the repetition rate at which the sequence of light pulses is generated, the determination of the phase angle is not affected by the amplitude modulation at the reflectors.

Three other retroreflectors 273 are provided at another side face of the housing of the measuring head 262. Another system 266 for path length measurement which is schematically shown determines a path length for three different paths 274 which are covered by a sequence of light pulses between a reference position of the system 266 and respectively one of the three retroreflectors 273 which are provided at the side of the measuring head 262 that faces toward the system 266. The configuration of the three other retroreflectors 273 and of the other system 266 for path length measurement corresponds to that of the three retroreflectors 272 and of the system 265. By using the three other retroreflectors on the other side of the measuring head, the position determination may be performed by the system 267 even when the beam path between the system 265 and one of the retroreflectors 271 is interrupted.

As described with reference to FIG. 15, the position of the measuring head 262 may be determined in response to a trigger signal in the coordinate measuring device 261.

In other embodiments an optical fiber or plural optical fibers may be used to guide the sequence of light pulses. An end of the optical fiber may in this case be mounted to a point, the position of which is to be determined in space. An end of the optical fiber may be provided at a measuring head of a coordinate measuring device, for example.

Figure 17:
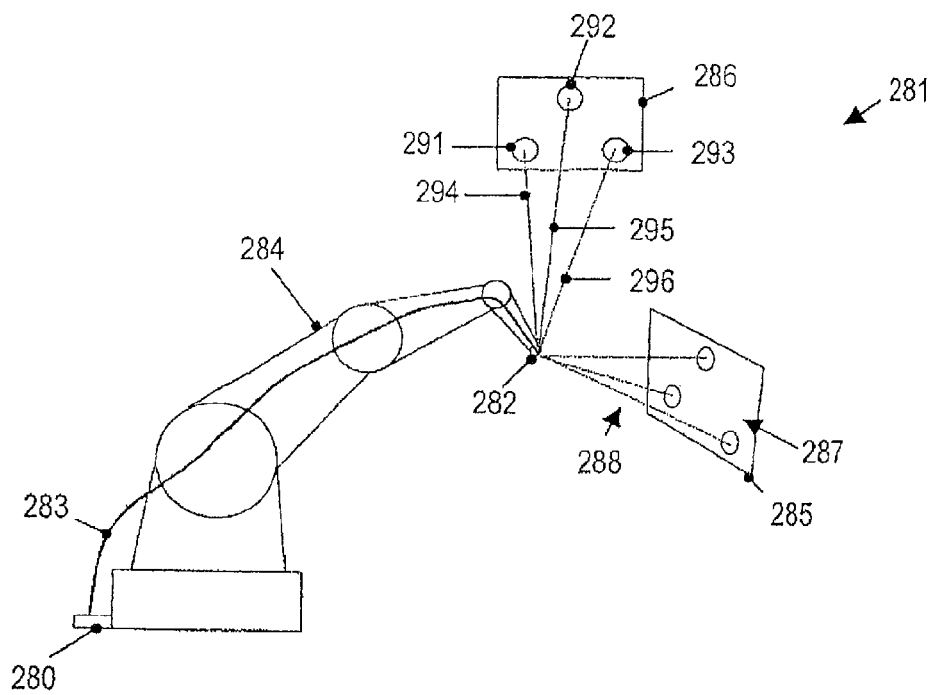
FIG. 17 is a schematic representation of a coordinate measuring device according to another embodiment.

FIG. 17 is a schematic representation of a measuring arrangement for determining the position of a robot arm 284 which may be used in a coordinate measuring device 281. The robot arm 284 has an end 282 which may be used as a measuring head of a coordinate measuring device 281, for example, and which may have a suitable sensor system (not shown) for this purpose.

The measuring arrangement comprises an optical fiber 283 which may be formed as a glass or plastic fiber, for example. An end of the optical fiber is mounted to the measuring head 282. Another end of the optical fiber is coupled to a light source 280 of the system for path length measurement, which in operation generates a sequence of light pulses with a repetition rate and couples the sequence of light pulses into the optical fiber 283. The end of the optical fiber that is mounted to the measuring head 282 is configured such or is provided with optical components such that the sequence of light pulses is emitted from the measuring head 282 in an angular range.

The measuring arrangement comprises a detector array 286 having three detectors 291-293, which may be configured as photodetectors, for example. The photodetectors 291-293 capture the sequence of light pulses which is output from the end of the optical fiber at the head of the robot arm. An evaluation device (not shown) evaluates the measured signals captured by the photodetectors 291-293 to determine a phase angle of a component of the measured signals, which component oscillates with the repetition rate or a multiple of the repetition rate. The evaluation device may determine the phase angle relative to reference signals, which may be generated from an output signal of the light source 280, for example. Thereby, path length differences between a path 294 from the measuring head 282 to the photodetector 291, a path 295 from the measuring head 282 to the photodetector 292 and a path 296 from the measuring head 282 to the photodetector 293 may be determined. The position of the measuring head 282 may be determined from the known relative positions of the photodetectors 291-293 relative to each other and from the path lengths of the paths 294-296 between the measuring head 282 and the photodetectors. The length and the refractive index of the optical fiber 283 may be taken into account in this case.

The measuring arrangement comprises another detector array 285 having three other detectors 287, which may be configured as photodetectors, for example. An evaluation device (not shown) evaluates the measured signals captured by the three photodetectors 287, to determine three other path lengths 288 between the measuring head 282 and the photodetectors 287, for example. Depending on the visibility of the measuring head 282, three arbitrary ones of the photodetectors 287 and 291-293 may be used to determine the position of the measuring head 282. In this process, it is also possible that signals of two photodetectors of the detector array 286 and of a photodetector of the detector array 285 are evaluated, for example. Thus, the position determination of the measuring head 282 may be performed even if a beam path may possibly be blocked by the measuring object.

As described with reference to FIG. 15, the position of the measuring head 282 may be determined in response to a trigger signal in the coordinate measuring device 281.

Figure 18:
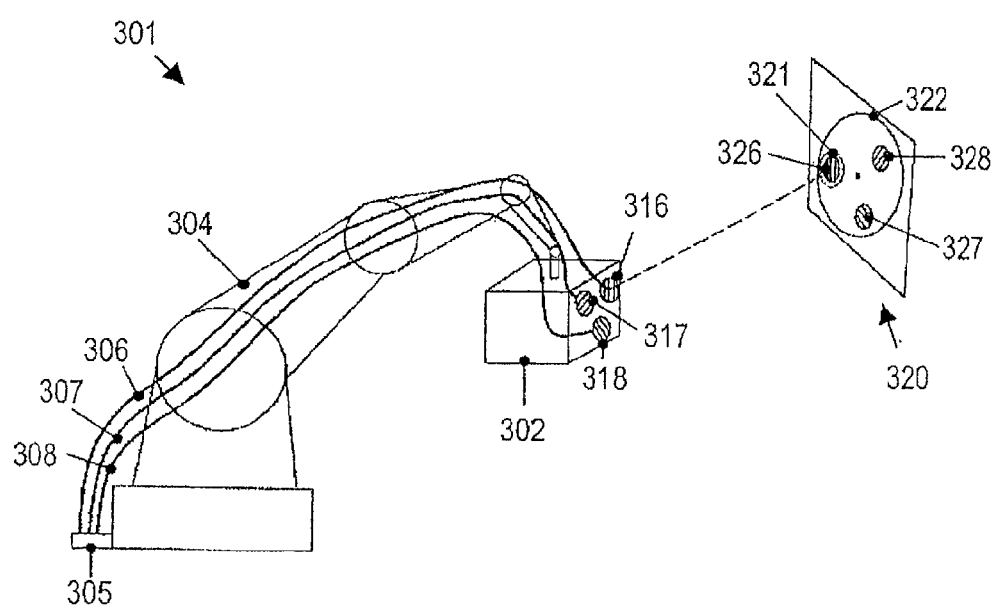
FIG. 18 is a schematic representation of a coordinate measuring device according to another embodiment.

FIG. 18 is a schematic representation of a coordinate measuring device 301 according to an embodiment. The coordinate measuring device 301 comprises a robot arm 304. A measuring head 302 is provided at an end of the robot arm 304. The robot arm 304 is provided to move the measuring head 302, for example in order to scan a surface of an object.

A measuring arrangement comprises three optical fibers 306-308. An end 316-318 of each optical fiber 306-308 is mounted on the measuring head 302. The respectively other end of the optical fibers is coupled to a light source 305 of the measuring arrangement. Separate light sources may be provided which respectively generate a sequence of light pulses having a repetition rate, with the light generated by the different light sources having different wave lengths and color, respectively. Accordingly, light of different wavelengths may be coupled into the three optical fibers 306-308, with the intensity being respectively modulated with the repetition rate. The ends of the optical fibers 306-308 which are mounted on the measuring head 302 are configured such or are provided with optical components 316-318 such that the sequence of light pulses is emitted in an angular range from the measuring head 302.

The measuring arrangement comprises a detector device 320 having a photodetector 321 and a filter wheel 322. The filter wheel 322 has color filters 326-328. The filter wheel 322 is configured such that, depending on its position, only the sequence of light pulses which is output from a given one of the three optical fibers 306-308 is detected. For example, the color filter 326 may be configured such that it transmits light having the wavelength which is coupled into the optical fiber 306 and does not transmit light having the wavelengths which are coupled into the optical fibers 307 and 308. The color filter 327 may be configured such that it transmits light having the wavelength which is coupled into the optical fiber 307, and that it does not transmit light having the wavelengths which are coupled into the optical fibers 306 and 308. The color filter 328 may be configured such that it transmits light having the wavelength which is coupled into the optical fiber 308, and that it does not transmit light having the wavelengths which are coupled into the optical fibers 306 and 307.

By rotating the filter wheel 322, signals may be evaluated in a time-sequential manner which travel to the photodetector 321 from different ends of the optical fibers 306-308 which are mounted on the measuring head 302 in a spaced relation.

Figure 19:
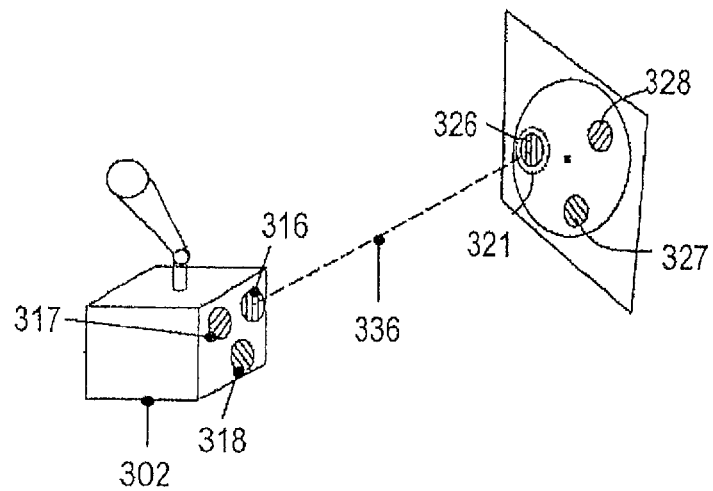
FIGS. 19A, 19B and 19C illustrate the measuring arrangement for the coordinate measuring device of FIG. 18 at different times.
Figure 19:
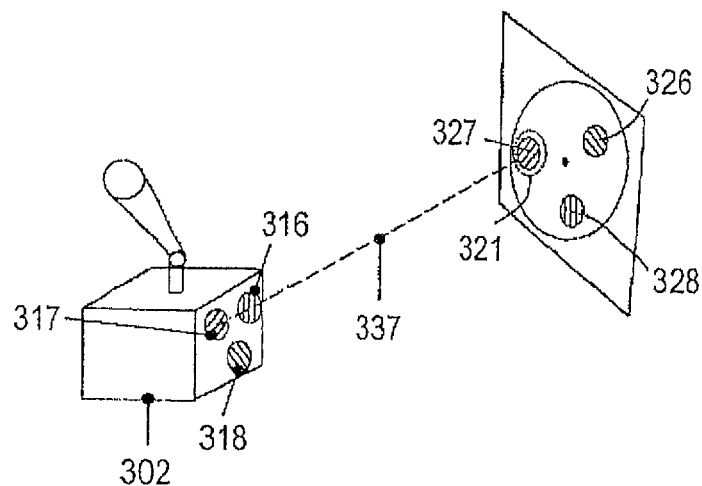
Figure 19:
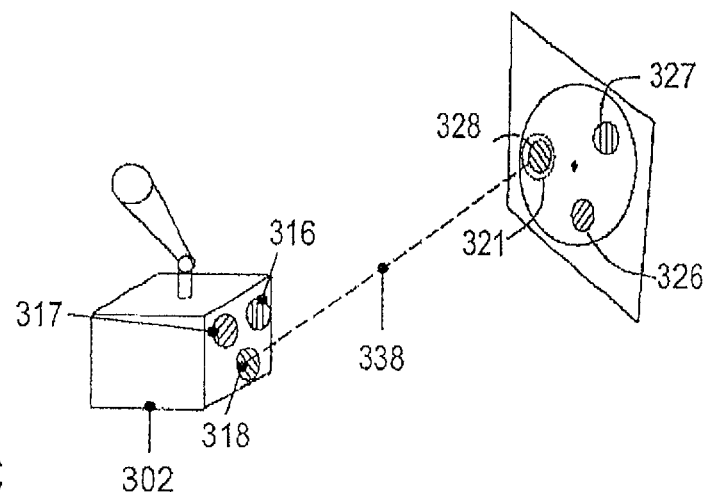

FIG. 19 shows different positions of the filter wheel. In the position of the filter wheel shown in FIG. 19A, the photodetector 321 captures the sequence of light pulses which exits the end of the optical fiber 306 and propagates to the photodetector 321 along a path 336. In the position of the filter wheel shown in FIG. 19B, the photodetector 321 captures the sequence of light pulses which exits the end of the optical fiber 307 and propagates to the photodetector 321 along a path 337. In the position of the filter wheel shown in FIG. 19C, the photodetector 321 captures the sequence of light pulses which exits the end of the optical fiber 308 and propagates to the photodetector 321 along a path 338.

An evaluation device (not shown) evaluates the signals which are captured in a time-sequential manner. Based on the phase angle of components of the signals which are captured in a time-sequential manner, which components oscillate with the repetition rate or a multiple of the repetition rate, the three path lengths 336, 337 and 338 may be determined, for example. The lengths of the optical fibers and the refractive index of the optical fibers may be taken into account in this process.

As described with reference to FIG. 15, the position of the measuring head 302 may be determined in response to a trigger signal in the coordinate measuring device 301.

Figure 20:
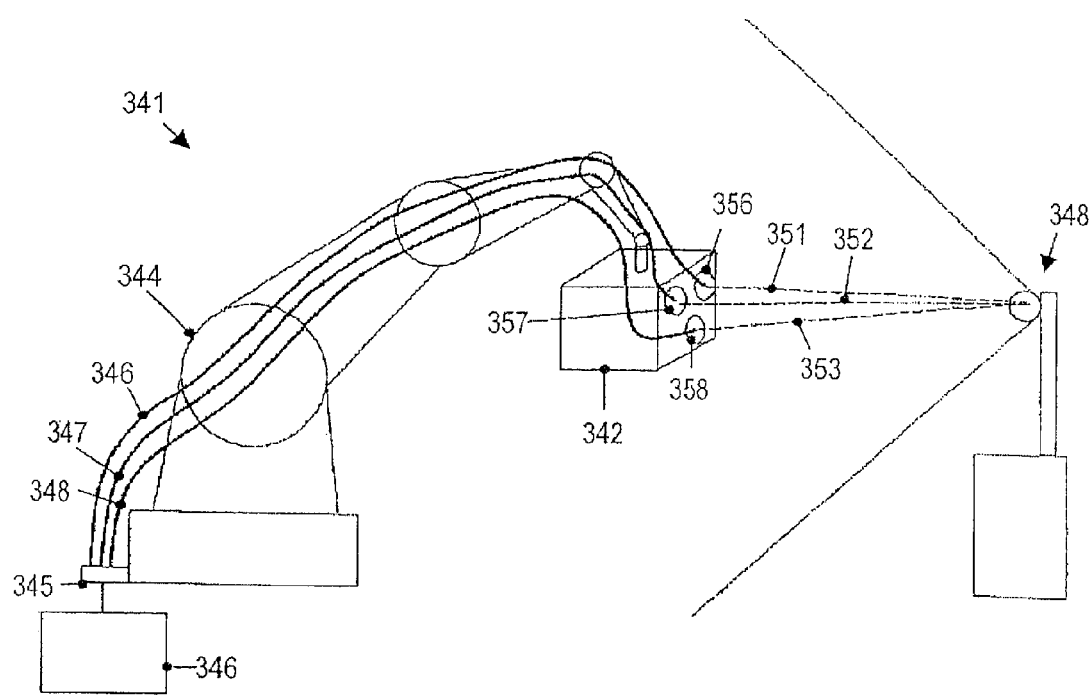
FIG. 20 is a schematic representation of a coordinate measuring device according to another embodiment.

FIG. 20 is a schematic representation of a coordinate measuring device 341 according to an embodiment. The coordinate measuring device 341 comprises a robot arm 344. A measuring head 342 is provided at an end of the robot arm 344. The robot arm 344 is provided to move the measuring head 342, for example in order to scan a surface of an object.

The measuring arrangement for determining the position of the measuring head 342 has three optical fibers 346, 347 and 348. An end of each optical fiber is mounted on the measuring head 342. An array of three receivers 356, 357 and 358 is provided on the measuring head. The end of each optical fiber 346-348 which is mounted on the measuring head 342 is coupled to one of the receivers 356-358, which couple light into the associated optical fiber 346-348. The other ends of the optical fibers 346-348 are coupled to a detector device 345. The detector device 345 may comprise a photodetector for each one of the optical fibers 346-348, which captures an intensity of the light signal which is guided in the respective optical fiber 346-348 to the associated photodetector.

The measuring arrangement comprises a light source 348 located at a fixed position, which is configured to generate a sequence of light pulses with a repetition rate and to irradiate the sequence of light pulses into a spatial region in which the position of the measuring head 342 is to be determined. The light source 348 may comprise a short pulse laser or a frequency comb generator having a suitable expansion optics, for example.

The measuring arrangement comprises an evaluation device 346 coupled to the detector device 345. The evaluation device 346 may for example be configured to determine a phase difference between a component of an intensity captured by one of the photodetectors, which component oscillates with the repetition rate or multiple of the repetition rate, and a component of a reference signal which oscillates with the same frequency. The reference signal may be provided by the light source 348, for example, or may be captured by another photodetector which is located at a fixed position. The three path lengths of the paths 351, 352, 353 may be determined from the three determined phase angles, for example. The lengths of the optical fibers 346-348 and the refractive index of the optical fibers 346-348 may be taken into account in this process.

As explained with reference to FIG. 15, the position of the measuring head 342 may be determined in response to a trigger signal in the coordinate measuring device 341.

Figure 21:
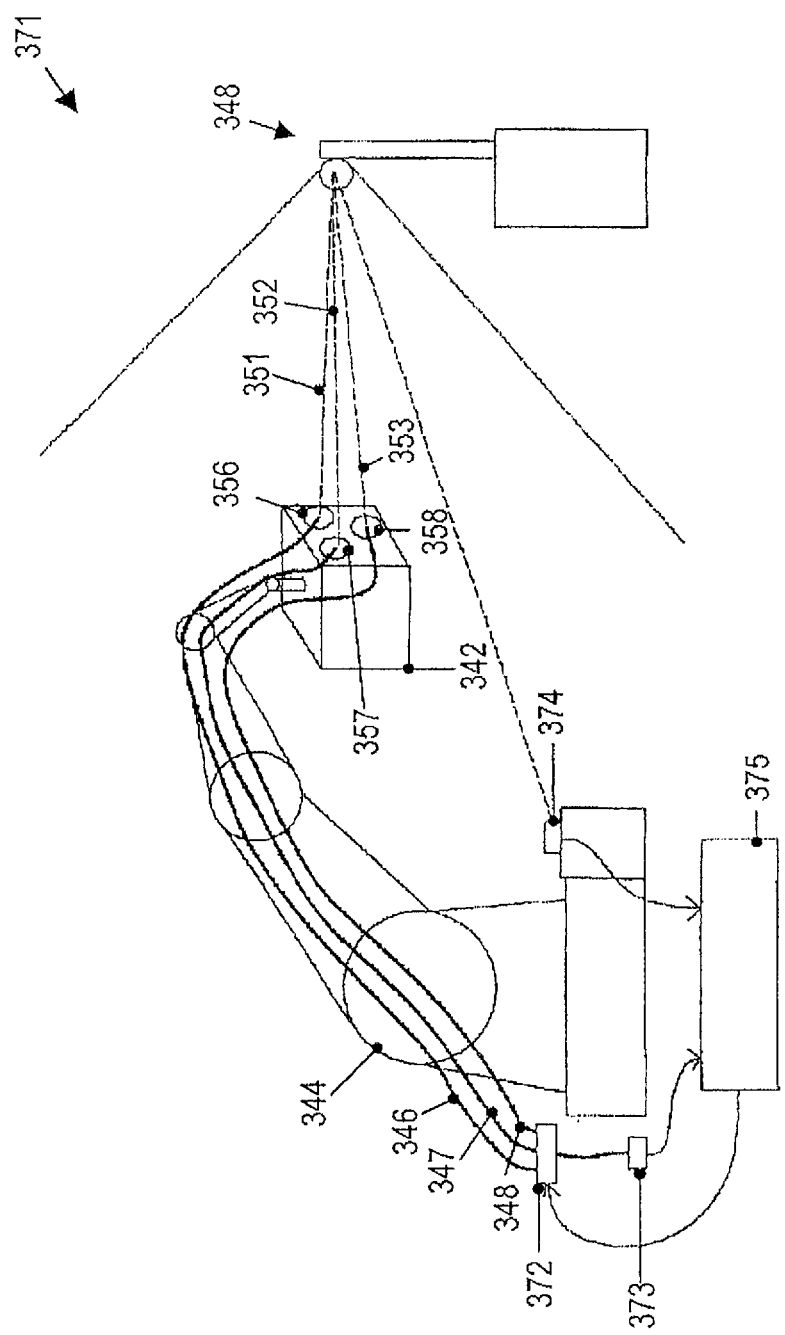
FIG. 21 is a schematic representation of a coordinate measuring device according to another embodiment.

FIG. 21 is a schematic representation of a coordinate measuring device 371 according to an embodiment. Elements or devices of the coordinate measuring device 371 which correspond, with regard to their function and configuration, to elements or devices of the coordinate measuring device 341 of FIG. 20 are designated with the same reference numerals, with additional reference being made to the description of the coordinate measuring device 341.

The measuring arrangement of the coordinate measuring device 371 comprises a fiber optic multiplexer 372. The ends of the optical fibers 346-348 which are not mounted on the measuring head 342 are coupled to the fiber optic multiplexer 372. The fiber optic multiplexer 372 is coupled to an evaluation device 375 and is driven in a cyclical manner and synchronously with the capturing of measured values by the evaluation device, to control which one of the signals guided by the optical fibers 346-348 is output by the fiber optic multiplexer 372 to a detector 373. The detector 373 may be configured as a photodetector which captures the intensity of the output signal of the fiber optic multiplexer 372 as a function of time. The detector 373 outputs a measured signal, which represents the captured intensity, to the evaluation device 375.

Another photodetector 374 is provided at a fixed location and in the base of the robot arm 344, for example. The other photodetector serves as reference detector for the measurement. The path length between the other photodetector 374 and the light source 348 is time invariant, as both devices are stationary. A reference phase may be derived from the intensity captured by the other detector 374. An output signal of the other photodetector 374 is provided to the evaluation device 375. The evaluation device 375 is configured to determine a phase angle between a component of the measured signal provided by the detector 373 and a component of the reference signal provided by the other detector 374, with the components respectively oscillating with the repetition rate or a multiple of the repetition rate. Phase angles for the sequences of light pulses which have travelled through the different paths 351-353 from the light source 348 to the ends of the optical fibers 346-348 may be determined in a time-sequential manner by switching over the fiber optic multiplexer 372. The three path lengths of the paths 351, 352 and 353 may be determined from the determined phase angles, for example. The lengths of the optical fibers 346-348 and the refractive index of the optical fibers 346-348 may be taken into account in this process. The position of the measuring head 342 may be determined from the three path lengths, for example by trilateration.

In another modification of the embodiment of FIG. 21, the fiber optics multiplexer 372 may be provided in or on the measuring head 342, so that only one optical fiber line must be guided along the robot arm 344. In another modification of the embodiment of FIG. 21, the complete evaluation device 375 may be integrated on or in the robot head 342, with an optical fiber guiding the reference signal as an optical signal from a stationary point of the robot base to the reference receiver.

As described with reference to FIG. 15, the position of the measuring head 342 may be determined in response to a trigger signal in the coordinate measuring device 371.

In the coordinate measuring devices and measuring arrangements for coordinate measuring devices according to various embodiments, the position of the measuring head may be determined using optical measurement techniques, it being thus no longer required to determine the position from the kinematics of the coordinate measuring device.

While the coordinate measuring devices may comprise measuring arrangements which simultaneously evaluate two components of a measured signal, a measuring arrangement having an evaluation device may be used in other embodiments in which only one component of the measured signal is evaluated, which component oscillates with the repetition rate or a multiple of the repetition rate. An evaluation device may be used as described in the German patent application DE 10 2009 024 460.3 entitled "Auswerteeinrichtung, Messanordnung and Verfahren zur Weglängenmessung" (Evaluation device, measuring arrangement and method for path length measurement) of the applicant, filed on the same day, for example.

The methods and measuring arrangements described with reference to FIG. 17-21 can not only be used to determine the position of a measuring head of a coordinate measuring device, but may generally be used to determine the position of an object, in particular in two or three dimensions. Accordingly, a measuring arrangement for measuring a position of an object may comprise an optical fiber which is configured to guide a sequence of light pulses having a repetition rate, and an evaluation device which is configured to evaluate a measured signal which represents the intensity of a sequence of light pulses after passage through a path length between a reference position and the object, with the evaluation device determining a phase angle of a component of the measured signal, which component oscillates with the repetition rate or a multiple of the repetition rate.

Evaluation devices, measuring arrangements and methods according to various embodiments of the invention have been described in detail. Further modifications may be realized in other embodiments. The path length measurement may be performed using a sequence of light pulses, with the light having a wavelength in the visible, ultraviolet and in particular also infrared spectral region. In other embodiments, a sequence of electromagnetic pulses outside the optical spectral range may be used instead of a sequence of light pulses.

The evaluation devices, measuring arrangements and methods according to various embodiments of the invention allow a path length to be measured with a high spatial resolution, in particular using optical techniques. The path length measurement may for example be used for measuring the distance of an object from a reference position. By combining plural such path length measurements, the position of an object in a plane or in space may be determined by trilateration, for example for determining the position of a measuring head in a coordinate measuring device by optical means. The various embodiments may generally be used for determining a distance or a position with exemplary fields of application being measurement applications in industrial installations, such as automated production or transportation installations.

The invention claimed is:

1. An evaluation device for path length measurement, configured to evaluate a measured signal which represents an intensity of a sequence of pulses of electromagnetic radiation, as a function of time after the sequence has covered a path length to be measured, the sequence of pulses having a repetition rate, wherein the evaluation device is configured to evaluate a first component of the measured signal, which first component oscillates with a first frequency, and a second component of the measured signal, which second component oscillates with a second frequency that is greater than the first frequency, and wherein the evaluation device further comprises an evaluation logic which is configured to determine a first estimate for the path length based on an evaluation of both the first component of the measured signal and the second component of the measured signal, and to determine an estimate of the path length which is refined compared to the first estimate based on an evaluation of the second component of the measured signal wherein the evaluation device is configured to measure a first phase difference associated with the first component of the measured signal with a resolution of $2 \times \pi \times p/n$, such that the first estimate for the path length a oximates the ath length inaccuracy which is less than a quotient of a speed of light and of the second frequency, wherein the first frequency is equal to p times the repetition rate and the second frequency is equal to n times the repetition rate, with p and n being integer numbers.

2. The evaluation device according to claim 1, wherein the first frequency corresponds to the repetition rate or a multiple of the repetition rate, and the second frequency corresponds to another multiple of the repetition rate.

3. The evaluation device according to claim 1, wherein the evaluation device is configured to determine a first phase difference associated with the first component of the measured signal and a second phase difference associated with the second component of the measured signal in order to determine the path length; wherein the first phase difference is a phase difference between the first component of the measured signal and a first reference signal oscillating with the first frequency, and wherein the second phase difference is a phase difference between the second component of the measured signal and a second reference signal oscillating with the second frequency.

4. The evaluation device according to claim 3, wherein the evaluation device is configured to down-convert at least the second component of the measured signal to determine the second phase difference.

5. The evaluation device according to claim 4, wherein the evaluation device comprises a mixer to generate a down-converted signal by down-converting the second component, which down-converted signal oscillates with the first frequency, and wherein the evaluation device comprises at least two mixers to down-convert the second component in plural stages.

6. The evaluation device according to claim 1, wherein the evaluation device is configured to down-convert the first component of the measured signal and the second component of the measured signal to generate a first down-converted signal and a second down-converted signal, which respectively oscillate with a frequency that is less than the repetition rate.

7. The evaluation device according to claim 1, comprising a first signal processing path for processing the first component of the measured signal and a second signal processing path for processing the second component of the measured signal.

8. A measuring arrangement for path length measurement, comprising a detector configured to capture an intensity of a sequence of pulses of electromagnetic radiation, as a function of time after the sequence has covered a path length to be measured, the sequence of pulses having a repetition rate, the detector being configured to provide a measured signal which represents the captured intensity, and an evaluation device according to claim 1, the evaluation device being coupled to the detector to evaluate the measured signal provided by the detector.

9. The measuring arrangement according to claim 8, comprising a light source to generate the sequence of pulses, wherein the light source comprises a frequency comb generator to generate an optical frequency comb.

10. A method for path length measurement, wherein a measured signal is captured and evaluated, the measured signal representing an intensity of a sequence of pulses of electromagnetic radiation as a function of time after the sequence has covered a path length to be measured, the sequence of pulses having a repetition rate, wherein a first component of the measured signal and a second component of the measured signal are evaluated to measure the path length, the first component oscillating with a first frequency, and the second component oscillating with a second frequency that is greater than the first frequency, wherein both the first component of the measured signal and the second component of the measured signal are evaluated to determine a first estimate for the path length, and wherein the second component of the measured signal is evaluated to determine an estimate of the path length which is refined compared to the first estimate, wherein the evaluation device is configured to measure a first phase difference associated with the first component of the measured signal with a resolution of $2\times\pi\times p/n$ such that the first estimate for the path length approximates the path length with an inaccuracy which is less than a quotient of a speed of light and the second frequency, wherein the first frequency is equal to p times the repetition rate and the second frequency is equal to n times the repetition rate, with p and n being integer numbers.

11. The method according to claim 10, wherein the first frequency corresponds to the repetition rate or a multiple of the repetition rate, and wherein the second frequency corresponds to another multiple of the repetition rate.

12. The method according to claim 10, wherein a first down-converted signal is generated by down-converting the first component of the measured signal and a second down-converted signal is generated by down-converting the second component of the measured signal, wherein the first down-converted signal and the second down-converted signal oscillate with a frequency that is less than the repetition rate.

13. The method according to claim 10, wherein the first component of the measured signal and the second component of the measured signal are evaluated simultaneously.

14. A measuring arrangement for determining a position of a measuring head of a coordinate measuring device, comprising:
an evaluation device configured to evaluate a measured signal which represents an intensity of an amplitude-modulated signal of electromagnetic radiation which has a repetition rat as a function of time after the signal has traveled through a path between a reference position and the measuring head, wherein the evaluation device is configured to determine a phase angle of a component of the measured signal, which component oscillates with the repetition rate or a multiple of the repetition rate, to determine at least one coordinate of the measuring head;
an optical fiber, an end of which is mounted to the measuring head; and
a sensor to generate a trigger signal when the measuring head is located at a predetermined position relative to an object surface wherein the evaluation device is configured to evaluate the measured signal in response to receiving the trigger signal from the sensor.

15. The measuring arrangement according to claim 14, wherein the evaluation device is configured to evaluate the measured signal in response to the trigger signal, to determine or store the position of the measuring head.

16. The measuring arrangement according to claim 14, comprising a detector device to capture the intensity of the signal of electromagnetic radiation after the signal has traveled through the path between the reference position and the measuring head, and to provide the measured signal, wherein another end of the optical fiber is coupled to the detector device.

17. The measuring arrangement according to claim 14, comprising a light source to generate the sequence of light pulses, wherein another end of the optical fiber is coupled to the light source.

18. The measuring arrangement according to claim 14, wherein the measuring arrangement is configured to measure at least three distances between one or plural reference positions and one or plural regions of the measuring head, and to determine the position of the measuring head of the coordinate measuring device from the at least three distances.

19. The measuring arrangement according to claim 14, wherein the evaluation device is configured as an evaluation device according to claim 1.

20. The evaluation device according to claim 1, wherein the sequence of pulses of electromagnetic radiation is a sequence of light pulses.

21. The measuring arrangement according to claim 8, wherein the sequence of pulses of electromagnetic radiation is a sequence of light pulses.

22. The method according to claim 10, wherein the sequence of pulses of electromagnetic radiation is a sequence of light pulses.

23. The measuring arrangement according to claim 14, wherein the amplitude-modulated signal of electromagnetic radiation is a sequence of light pulses having a repetition rate.

24. The measuring arrangement according to claim 14, wherein the sensor is an optical or tactile sensor.

25. The measuring arrangement according to claim 17 wherein the light source is a short pulse laser.

* * * * *

UNITED STATES PATENT AND TRADEMARK OFFICE
CERTIFICATE OF CORRECTION

| | | |
|---|---|---|
| PATENT NO. | : 8,780,331 B2 | Page 1 of 1 |
| APPLICATION NO. | : 13/377440 | |
| DATED | : July 15, 2014 | |
| INVENTOR(S) | : Spruck et al. | |

It is certified that error appears in the above-identified patent and that said Letters Patent is hereby corrected as shown below:

In the Claims

Column 34, lines 24-25 (Claim 1) change "radiation, as a function" to --radiation as a function-- by removing the ",".

Column 34, lines 42-43 (Claim 1) change "the path length a oximates the ath length inaccuracy" to --the path length approximates the path length with an inaccuracy--.

Column 35, line 54 (Claim 10) change "and the second frequency" to --and of the second frequency--.

Column 36, line 12 (Claim 14) change "rat" to --rate--.

Signed and Sealed this
Twenty-first Day of October, 2014

Michelle K. Lee
*Deputy Director of the United States Patent and Trademark Office*